(12) United States Patent
Okada et al.

(10) Patent No.: US 7,580,117 B2
(45) Date of Patent: Aug. 25, 2009

(54) LASER RADAR APPARATUS THAT MEASURES DIRECTION AND DISTANCE OF AN OBJECT

(75) Inventors: Masanori Okada, Kariya (JP); Hideyuki Tanaka, Toyoake (JP); Koji Konosu, Kariya (JP); Tadao Nojiri, Oobu (JP)

(73) Assignee: Denso Wave Incorporated, Tokyo (JP)

( * ) Notice: Subject to any disclaimer, the term of this patent is extended or adjusted under 35 U.S.C. 154(b) by 26 days.

(21) Appl. No.: 12/068,265

(22) Filed: Feb. 5, 2008

(65) Prior Publication Data
US 2008/0316463 A1 Dec. 25, 2008

(30) Foreign Application Priority Data
Feb. 6, 2007 (JP) ............................. 2007-027167
Nov. 12, 2007 (JP) ............................. 2007-293225

(51) Int. Cl.
*G01C 3/08* (2006.01)
*G02B 5/08* (2006.01)

(52) U.S. Cl. ...................................... 356/4.01; 359/838
(58) Field of Classification Search ....... 356/4.01–5.15; 359/838, 876
See application file for complete search history.

(56) References Cited

U.S. PATENT DOCUMENTS

| | | | | |
|---|---|---|---|---|
| 4,154,529 A | * | 5/1979 | Dyott | ........................... 356/28 |
| 5,337,189 A | * | 8/1994 | Krawczyk et al. | ............ 359/850 |
| 5,455,669 A | * | 10/1995 | Wetteborn | .................. 356/5.01 |
| 5,808,727 A | * | 9/1998 | Katayama | ................... 356/4.01 |
| 7,259,838 B2 | * | 8/2007 | Carlhoff et al. | ............. 356/5.04 |
| 2002/0149761 A1 | * | 10/2002 | Saccomanno | .............. 356/5.03 |
| 2003/0043363 A1 | * | 3/2003 | Jamieson et al. | ........... 356/5.01 |
| 2004/0207832 A1 | * | 10/2004 | Ohtomo et al. | ............. 356/4.01 |
| 2005/0024625 A1 | * | 2/2005 | Mori et al. | .................. 356/4.01 |

FOREIGN PATENT DOCUMENTS

JP   A-H03-175390   7/1991

* cited by examiner

*Primary Examiner*—Isam Alsomiri
(74) *Attorney, Agent, or Firm*—Posz Law Group, PLC

(57) ABSTRACT

A laser radar including laser beam generating means, photo detecting means, a mirror, light deflecting means, and rotation driving means. The laser beam generating means emits a laser beam having an axis thereof. The photo detecting means detects a reflected laser beam that is reflected back by an object. The mirror includes a through-hole that passes the laser beam and a reflecting surface that reflects a reflected laser beam reflected back by the object toward the photo detecting means. The light deflecting means deflects the laser beam toward a measuring region and reflects the reflected laser beam from the object toward the mirror. The rotation driving means rotates the light deflecting means so as to direct the laser beam toward the measuring region.

19 Claims, 12 Drawing Sheets

COMPARATIVE ART

LASER RADAR APPARATUS THAT MEASURES DIRECTION AND DISTANCE OF AN OBJECT

CROSS REFERENCE TO RELATED APPLICATION

The present application relates to and incorporated by reference Japanese Patent Applications 2007-027167 filed on Feb. 6, 2007 and 2007-293225 filed on Nov. 12, 2007.

BACKGROUND OF THE INVENTION

1. The Field of the Invention

The invention relates to a laser radar apparatus and a method for measuring both the direction of an object and the distance to an object from the apparatus using a laser beam.

2. Description of the Prior Art

As laser radar apparatus capable of measuring both the direction of an object and the distance to an object from the apparatus, there is a known apparatus such as disclosed by Hoashi et al. in Japanese Patent No. 2789741.

The laser radar apparatus of Hoashi et al. includes a laser beam generating means for emitting a laser beam or a laser pulse serving as an outgoing light into a measurement range, the outgoing light having an optical axis thereof, a photo detecting means for detecting the reflected laser beam or the reflected laser pulse that arrives after the outgoing light is reflected by an object located in the measurement range and serve as an incoming light, an optical isolator that allows the outgoing light to transmit therethrough and forbids the incoming light to pass, and an electric control unit (ECU). The laser beam generating means is, for example, a laser diode that produces laser emission including a laser beam and a laser pulse. The photo detecting means is, for example, a photo diode that converts an incident laser beam or an incident laser pulse to an electric current that is a function of intensity of the incident laser beam or the incident laser pulse. The optical isolator reflects the incoming light, and the incoming light reflected by the optical isolator will be directed to the photo detecting means. In order to realize these functions, it is preferable that the optical isolator is located on the optical axis of the outgoing light. The electric control unit (ECU) calculates a distance from the apparatus to the object, if it exists, based on the difference of the phases of the outgoing and incoming laser beams, or the time of flight between the emission and reception of the laser pulse utilizing the speed of light. Further, the laser radar apparatus of Hoashi et al. includes a concave mirror that deflects the outgoing light toward the measurement range and the incoming light reflected back by the object toward the photo detecting means. Further the concave mirror is arranged to rotate up to 360 degrees so that an angular scanning range in the horizontal direction can be realized to be of up to 360 degrees. It should be noted that in the optical laser apparatus of Hoashi et al., a projection optical system includes the laser beam generating means, the optical isolator, and the concave mirror, and a photo detecting system includes the concave mirror and the optical isolator. The projection optical system and the photo detecting means are arranged coaxially in part. In more detail, the axes of the outgoing light and the incoming light between the optical isolator and the object are identical.

As described above, in the laser radar apparatus of Hoashi et al. or a laser radar apparatus of similar type, the axes of the outgoing light and the incoming light are identical, and the optical isolator is arranged to be located on the common axis to the outgoing light and the incoming light. The outgoing light emitted by the laser beam generating means pass through the optical isolator although the incoming light reflected back by the object is reflected from the optical isolator. In general, attenuation of the laser beam or the laser pulse may be caused during both the transmission and the reflection of the laser beam or the laser pulse through and from the optical isolator, respectively. Hence, beam splitting efficiency is degraded during the transmission and the reflection of the laser light through and from the optical isolator. This leads to a special configuration of some elements of the optical laser radar apparatus, for example, a bigger mirror having a larger mirror plate to enlarge an effective photo-receiving area so as to improve the beam splitting efficiency. This conflicts with the tendency of reducing the size of the apparatus.

SUMMARY OF THE INVENTION

It is an object of the present invention to provide a laser radar apparatus that has an improved beam splitting efficiency and an improved accuracy of detecting the direction of an object and the distance to the object from the apparatus without sacrificing the small size of the laser radar apparatus due to a coaxial structure of the projection optical system and photo detecting system.

According to an aspect of the present invention, a laser radar apparatus that measures the distance of an object and the direction to the object, the object being located in a measurement range from the laser radar apparatus, includes laser beam generating means, photo detecting means, a mirror assembly, light deflecting means, and rotation driving means. The laser beam generating means generates a laser beam having an axis thereof and emitting the laser beam toward the measurement range. The photo detecting means detects a reflected laser beam that is reflected back by the object located in the measurement range. The mirror assembly further includes a through-hole and a reflecting surface. The through-hole pierces the mirror assembly being coaxial with the axis of the laser beam emitted from the laser beam generating means, and allows the laser beam emitted from the laser beam generating means to pass. The reflecting surface is arranged to be at a predetermined angle to the axis of the laser beam emitted from the laser beam generating means and reflects a reflected laser beam from the object toward the photo detecting means. The light deflecting means deflects the laser beam emitted from the laser beam generating means toward the measurement range, and deflects the laser beam reflected back by the object located in the measurement range toward the mirror assembly, wherein the light deflecting means has a rotation axis thereof and a mirror surface. The rotation driving means rotates the light deflecting means around the rotation axis of light deflecting means such that the mirror surface of the light deflecting means is turned to face in the direction of the measurement range.

According to another aspect of the present invention, a method for measuring the distance of an object located in a measurement range from the laser radar apparatus, includes steps of: generating a laser beam having an axis thereof and emitting the laser beam toward the measurement range; splitting the laser beam into the first laser beam that is directed to the measuring range and the second laser beam that is directed to the photo detecting mean; detecting the second laser beam by the photo detecting means to estimate the intensity of the second laser beam; estimating output power of the laser beam generating means based on the intensity of the second laser beam; comparing the estimated output power of the laser beam generating means with a reference value; adjusting the output power of the laser beam generating means according to the comparison; reflecting the reflected first laser beam from the object by the reflecting surface of the mirror assembly toward the photo detecting means; detecting the reflected first laser beam from the object by the photo detecting means; and calculating a distance from the apparatus to the object based on the difference of the phases of the outgoing and incoming laser beams or the time of flight between the emission and reception of the laser beam utilizing the speed of light.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings.

DETAILED DESCRIPTION OF PREFERRED EMBODIMENTS

Figure 1:
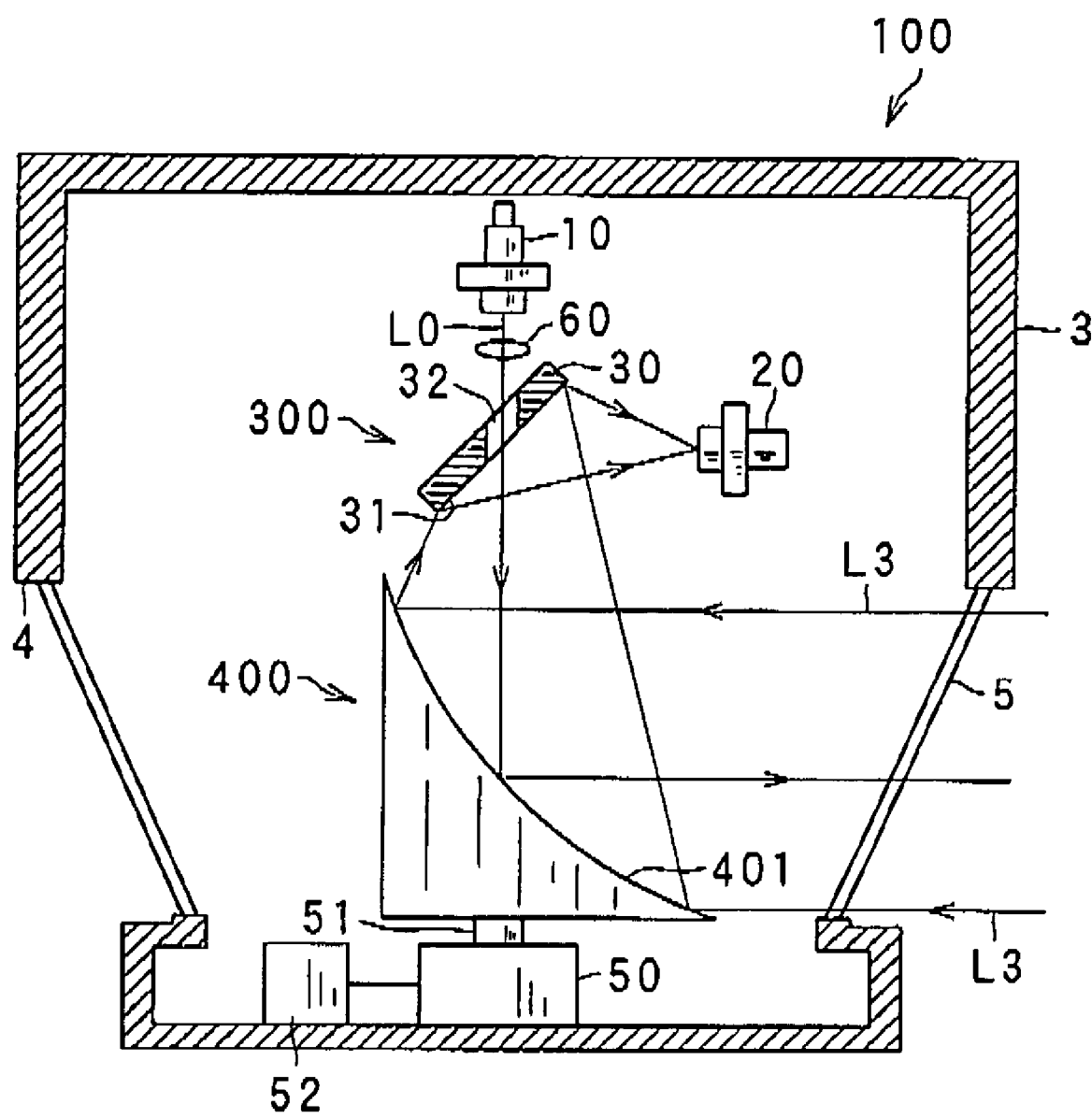
FIG. 1 is a schematic view of a laser radar apparatus according to a first embodiment of the present invention.

Preferred embodiments of the present invention will be explained below with reference to attached drawings. Identical constituents are denoted by the same reference numerals throughout the drawings.

First Embodiment

Figure 2:
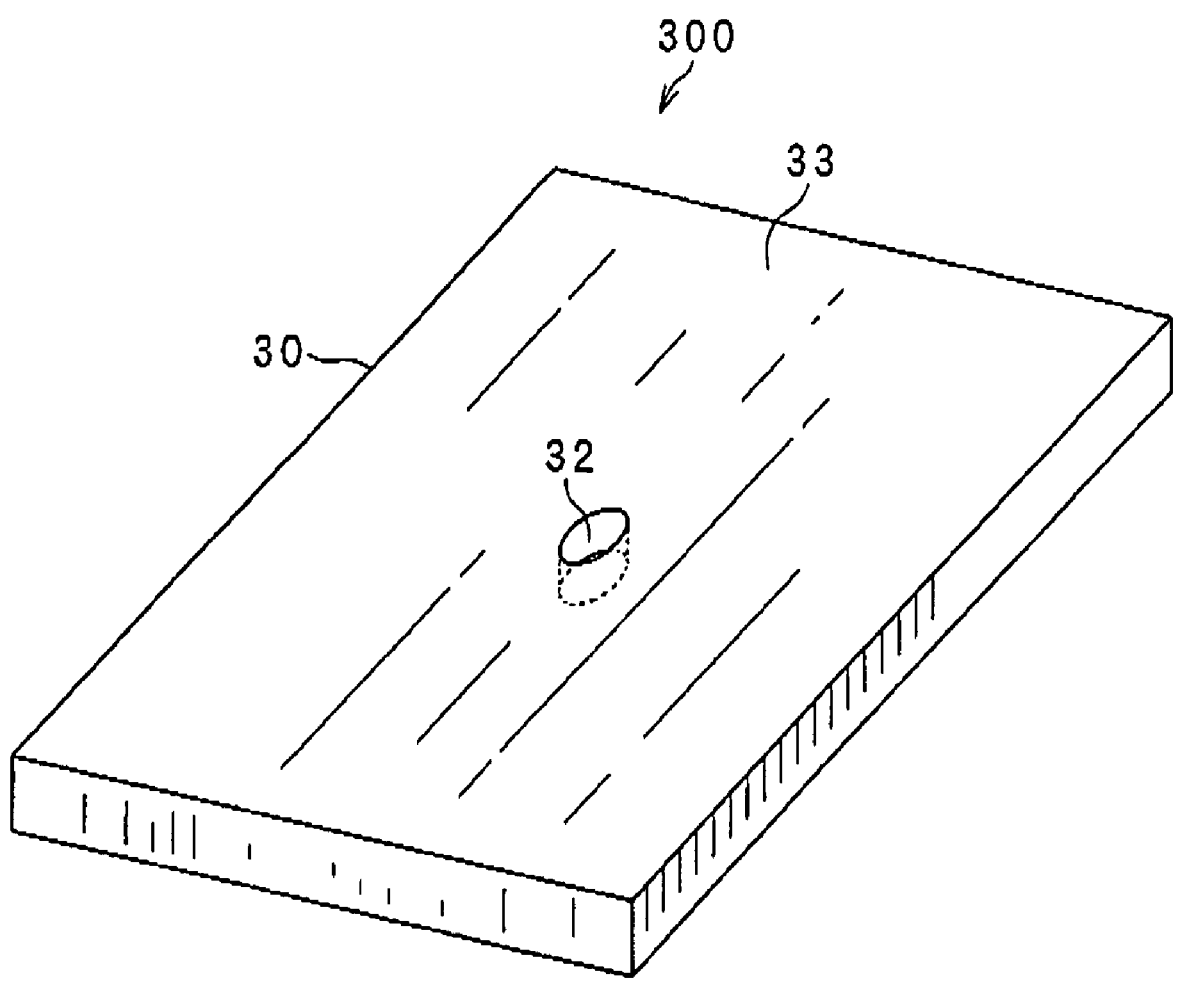
FIG. 2 is a schematic view of a mirror having a through-hole of the laser radar according to the first embodiment shown in FIG. 1.
Figure 3:
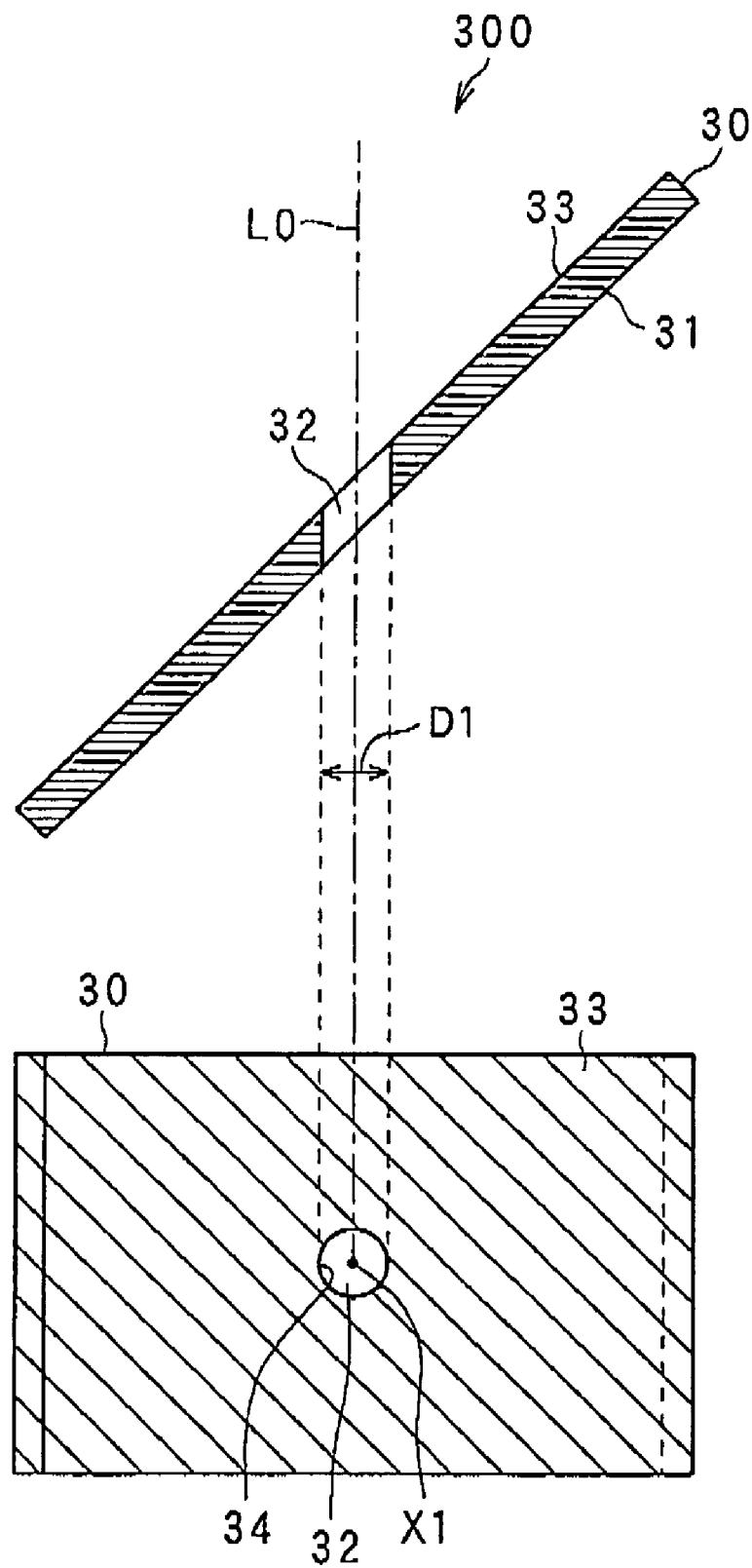
FIG. 3 is a cross sectional view and a bottom view of the mirror shown in FIG. 2.

Referring to FIGS. 1-3, a laser radar apparatus according to a first embodiment of the present invention will be described.

FIG. 1 is a schematic view of the laser radar apparatus 100 according to the first embodiment of the present invention.

As shown in FIG. 1, the laser radar apparatus 100 includes a laser diode 10 and a photo diode 20. The laser radar apparatus 100 is designed to detect the direction to an object located in a measurement range, if it exists, and the distance of the object from the apparatus based on the difference of the phases of an outgoing light L0 emitted by the laser diode 10 and an incoming light L3 that is reflected back by the object and received by the photo diode 20, or the time of flight between the emission of an outgoing light L0 and reception of an incoming light L3 utilizing the speed of light. In this embodiment, the laser diode 10 emits a laser pulse.

The laser diode 10 emits a laser pulse having an axis thereof as an outgoing laser beam L0 into a measurement range in response to a command signal from a laser diode controlling block which is not shown in FIG. 1. Laser beam generating means is constituted of the laser diode 10 and an unillustrated laser diode controlling block. The laser diode controlling block controls operation of the laser diode 10 by sending a command signal to the laser diode 10. In the present case where the laser pulse is emitted from the laser diode 10, the command signal contains an electric current pulse signal.

The photo diode 20 corresponds to a photo detecting means. The outgoing laser beam L0 is reflected by the object located in the measurement range to form a reflected laser beam or the incoming laser beam L3. Then, the reflected laser beam L3 is detected by the photo diode 20 and is converted to an electric signal whose amplitude is a function of an intensity of the reflected laser beam L3. In this embodiment, only that part of laser beam reflected by the object, the part of laser beam having an angle of reflection at a surface of the object of nearly 0 degree can return to the laser radar apparatus, as shown by parallel lines L3 in FIG. 1. The remaining part of the laser beam reflected by the object cannot be detected because of deviation from 0 degree in the angle of reflection at the surface of the object.

The laser radar apparatus 100 further includes an optical lens 60 and a mirror assembly 300. Both the optical lens 60 and the mirror assembly 300 are arranged to be coaxial with the axis of outgoing laser beam L0.

The optical lens 60 is of type a collimating lens that transforms the emitted laser beam L0 from the laser diode 10 to the laser pulses of parallel rays. The optical lens 60 corresponds to laser beam collimating means.

In the present embodiment, the mirror assembly 300 corresponds to a mirror 30. The mirror 30 is substantially formed as a plate having two surfaces. The mirror 30 has a reflection plane 31 which corresponds to one of the surfaces of the mirror 30 and a through-hole 32. The reflection plane 31 is arranged at predetermined angle to the axis of outgoing laser beam L0. The through-hole 32 has a center axis thereof and pierces the mirror 30 such that the center axis of the through-hole 32 crosses the surface of the reflection plate 31. The laser radar apparatus 100 according to the present invention is arranged such that the outgoing laser beam L0 and the incoming laser beam L3 are coaxial. The mirror 30 is arranged such that the outgoing laser beam L0 passes through the through-hole 32. Thus, the outgoing laser beam L0 passes through the mirror 30, although the incoming laser beam L3 is reflected by the mirror 30. The through-hole 32 and the outgoing laser beam L0 have a common axis. Further the reflection plate 31 of the mirror 30 reflects the incoming laser beam L3 so as to direct it to the photo diode 20. The mirror assembly 300 corresponds to beam isolating means.

The laser radar apparatus 100 according to the present embodiment further includes a rotary device 400. The rotary device 400 is arranged to be rotatable around a rotation axis which is identical with the axis of the outgoing laser beam L0 so that an angular scanning range in the horizontal direction can be realized to be of up to 360 degrees. The rotary device 400 includes a concave mirror 401 that deflects the outgoing laser beam L0 toward the measurement range and the incoming laser beam L3 reflected back by the object toward the mirror 30. The concave mirror 401 has a focal point on the rotation axis of the rotary device 400. The rotary device 400 is an example of a device having a concave shaped surface. The concave shaped surface is the concave mirror 401. The rotation angle of the rotary device 400 determines the direction of the object to be detected. The concave mirror 401 corresponds to a light deflecting means that includes the device having the concave shaped surface.

In order to drive the rotary device 400 to execute a continuous rotating movement, a motor 50 is provided. The motor 50 has an output shaft 51 that drives the rotary device 400 and the concave mirror 401. The motor 50 is an example of rotation driving means. A stepping motor may be used as the motor 50. In the stepper motor, a full rotation is divided into a plural number of steps. If the stepper motor is controlled under a manner where one step has very small rotation angle, it is possible to perform the rotating movement of the rotary device 400 with high resolution. Therefore, an accurate determination of the direction of the object can be achieved. Furthermore, it is allowable to use other type of motor than the stepper motor as the motor 50. For example, a servomotor may be useful. If a motor whose shaft rotates with a constant speed is used as the motor 50, a necessary time until the rotary device 400 is directed to a measurement range can be calculated easily. Thus, the laser diode controlling block is operated in such a manner in which the timing of outputting the electric current pulse as the command signal to the laser diode 10 is synchronized with the arrival timing when the rotation angle of the shaft of the motor is achieved at the desired value. As the result of this, the laser diode 10 emits the outgoing laser beam L0 with accurate timing to detect an object in the desired direction. Thus, the direction of the object and the distance to the object can be calculated quickly. In the present embodiment, in order to detect the rotation angle of the motor 50, a rotation angle sensor 52 is provided and is connected to the motor 50. A rotary encoder that converts the angle of the output shaft 51 of the motor 50 into an analog or digital electric signal is adopted to be used as an example of the rotation angle sensor 52. As discussed above, any type of electric motor may be acceptable to be used as the motor 50.

Further, in the present embodiment, a cover case 3 is provided to house the laser diode 10, the photo diode 20, the mirror assembly 300, the optical lens 60, and the rotary device 400. Thus, those elements can be prevented from being exposed to dust or being physically shocked. The cover case 3 has an optical window 4 through which the outgoing laser beam L0 exits the apparatus 100 and the incoming laser beam L3 enters into the apparatus 100, respectively. Hence, the optical window 4 is vertically aligned with the concave mirror 401. The optical window 4 surrounds the concave mirror 401 and has the shape of a ring having a center located at a point where the axis of the outgoing laser beam L0 intersects a cross section of the ring-shaped optical window 4. The optical window 4 is covered by a transparent plate 5 such as a transparent glass in order to prevent the concave mirror 401 and other constituents of the apparatus 100 from being exposed to dust. The transparent plate 5 is arranged to be at an angle that is slightly deviated from right angles with the axes of the outgoing laser beam L0 and the incoming laser beam L3. Thus, even if the outgoing laser beam L0 is reflected by the transparent plate 5, the reflected outgoing laser beam does not have its axis identical with the outgoing laser beam L0 and the incoming laser beam L3. Therefore, a reflection of the outgoing laser beam L0 by the transparent plate 5 may not generate any noise that interferes with determining the distance of the object from the apparatus 100.

Next, referring to FIGS. 2 and 3, the mirror assembly 300 corresponding to the mirror 30 in the present embodiment will be discussed in detail.

FIG. 2 is a schematic view of the mirror 30 having the through-hole 32 of the laser radar apparatus 100 according to the first embodiment shown in FIG. 1.

As shown in FIG. 2, the mirror 30 of the mirror assembly 300 is shaped like a plate having one surface 33 and another non-illustrated surface 31 opposite to the surface 33. The surface 31 of the mirror 30 corresponds to the reflection plane. The through-hole 32 is formed near the center of the surface 31 so as to pierce the mirror 40 from the surface 33 to the opposite surface 31.

FIG. 3 is the cross sectional view and over view of the mirror 30 shown in FIG. 2.

In the present embodiment, the through-hole 32 is formed such that the outgoing laser beam L0 passes through the through-hole 32, that is, the center axis of the through-hole 32 is arranged to be identical with the axis of the outgoing laser beam L0. As can be seen in FIG. 3, the through-hole 32 is empty in the present embodiment.

As shown in FIG. 3, the through-hole 32 is formed in the shape of the tube having an axis. The axis of the through-hole 32 is coincident with that of the outgoing laser beam L0. The through-hole 32 has a circular shaped cross section 34 along its axis. That is, if the through-hole 32 is projected to a plane perpendicular to the axis of the outgoing laser beam L0 as shown in FIG. 3, the projected image of the through-hole 32 is a circle 34 having its center at a point X1 that is the center of the cross section of the outgoing laser beam L0. The through-hole 32 has a constant diameter D1. It is allowed that the through-hole 32 has other shaped cross section such as an ellipse shaped one or the like.

As discussed above, in the laser radar apparatus 100 according to the present embodiment, the laser diode 10, the through-hole 32 of the mirror 30 and the optical lens 60 are arranged to be coaxial with the axis of the outgoing laser beam L0. The optical lens 60 converts the laser beam emitted by the laser diode 10 to the parallel ray of laser pulses. The diameter D1 of the through-hole 32 is determined according to optical characteristics of the laser diode 10 and the optical lens 60. For example, the diameter D1 of the through-hole 32 is determined to be slightly larger than that of the laser pulse of parallel rays collimated by the optical lens 60. Inversely, it is allowed that the optical lens 60 is designed to collimate the laser beam emitted by the laser diode 10 so as to have the maximum width smaller than the diameter D1 of the through-hole 32. In accordance with the design of the through-hole 32 of the mirror 30 or the optical lens 60, it is possible to prevent any reflection of the outgoing light L0 from the surface 33 of the mirror 30.

Further, it is allowed that in the laser radar apparatus 100, the beam isolating means further comprises an un-illustrated optical element for transmitting the outgoing laser beam L0 emitted from the laser beam generating means 10 toward the measurement range and reflecting the incoming laser beam L3 reflected back by the object located in the measurement range via the light deflecting means 401. In this case, the through-hole 32 of the beam isolating means 30 is at least partially covered by the optical element. Further, it is preferable that the optical element is made of a material that have high optical transmittancy.

The operation of the laser radar apparatus 100 will be explained.

First, the laser diode controlling block sends a command signal to the laser diode 10. The command signal contains, for example, the electric current pulse that lead the laser diode 10 to output the laser beam pulse L0 proportional to the electric current pulse. That is, the laser beam pulse having a width proportional to the electric current pulse L0 is emitted from the laser diode 10. The laser beam pulses L0 emitted from the laser diode 10 may slightly diffuse during their travel because the laser beam pulses L0 have an initial diffusion angle just after they are emitted from the laser diode 10.

Next, the laser beam pulses L0 are converted to the parallel laser pulses L0 by the optical lens 60.

The parallel ray of laser pulses L0 collimated by the optical lens 60 pass through the through-hole 32 of the mirror 30.

Then, the parallel ray of laser pulses L0 passed through the through-hole 32 of the mirror 30 become incident laser pulses L0 to the concave mirror 401.

The concave mirror 401 deflects the incident laser pulses L0, and the laser pulses L0 reflected from the concave mirror 401 emitted from the laser radar apparatus 100 toward the measurement range to detect an object.

If some object is located in the measurement range, the object reflects the laser pulses L0 emitted from the apparatus 100. Some part of the laser pulses having near-zero the angle of reflection at the surface of the object are reflected back to the apparatus 100 as the incoming laser beam L3.

After passing the optical window, the incoming laser beam L3 or incoming laser pulses L3 are deflected by the concave mirror 401. In this case, the concave mirror 401 serves as a collector lens that collects the incoming laser beam L3 to the mirror 30 such that the area of its cross section is reduced until all of the incoming laser beam L3 can be captured by the mirror 30. The deflected laser beam L3 from the concave mirror 401 is reflected by the mirror 30. Then, the incoming laser beam L3 enters the photo diode 20. The deflected laser beam L3 is detected by the photo diode 20 and is converted to an electric signal whose amplitude is a function of an intensity of the reflected laser beam L3.

In the present configuration, the time of flight between a moment when the outgoing laser beam L0 is emitted from the laser diode 10 and a further moment when the incoming laser beam L3 is captured by the photo diode 20 is measured to obtain the distance to the object that is located in the measurement range and reflected the outgoing laser beam L0 from the apparatus 100 using the speed of light. The direction of the object is directly obtained based on the rotation angle of the motor 50 that drives the concave mirror 401.

(Advantages of the Laser Radar Apparatus)

Figure 16:
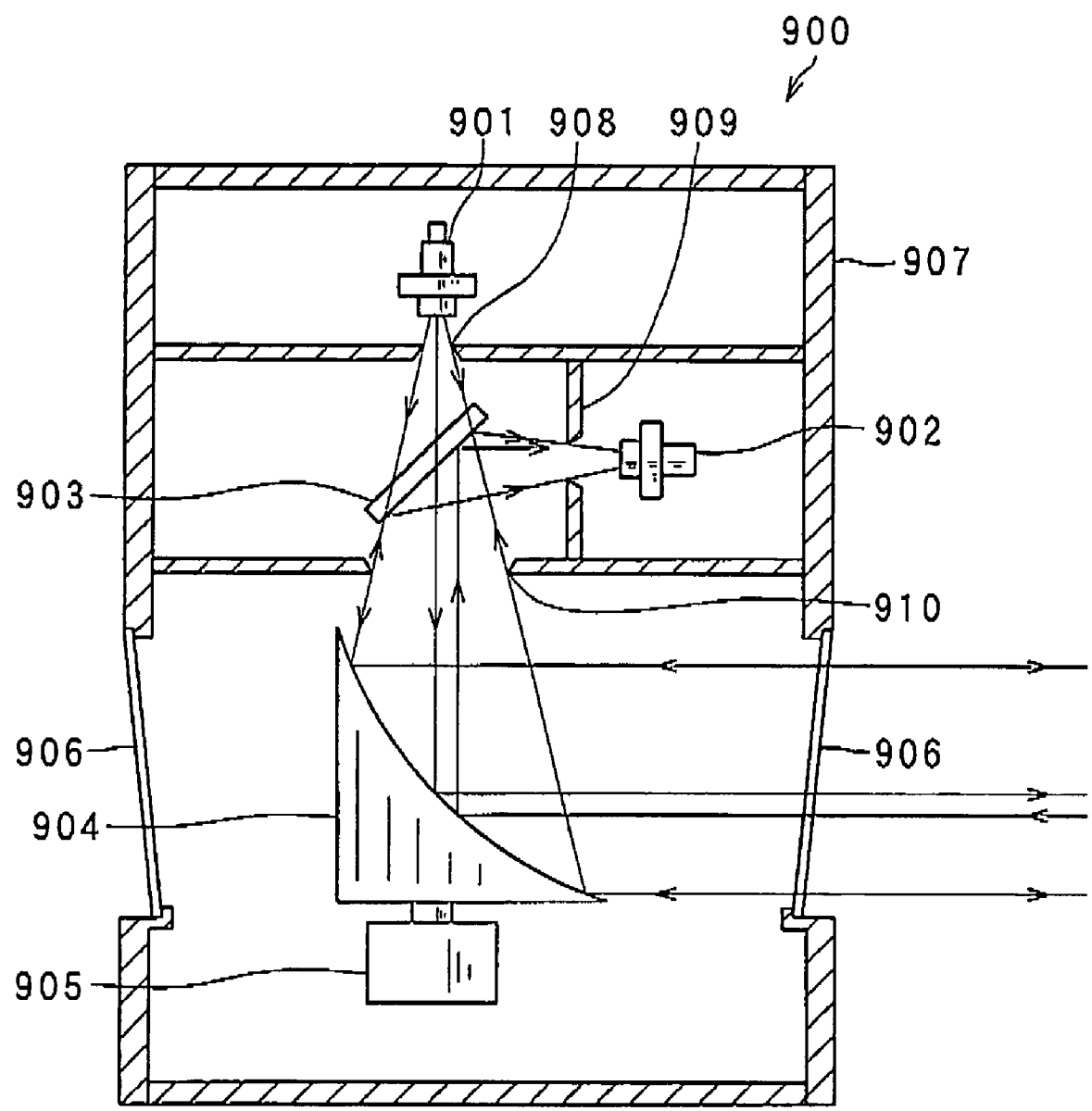
FIG. 16 is a schematic view of a conventional laser radar apparatus.

FIG. 16 is a schematic view of a conventional laser radar apparatus 900.

The known laser radar apparatus 900 has, similar to the laser radar apparatus 100 according to the present embodiment, included a laser diode 901, a photo diode 902, an optical isolator 903, a concave mirror 904, a motor 905, a optical window 906, a cover case 907, a first slit 908, a second slit 909, and a third slit 910. The apparatus 900 is configured to detect the distance of an object based on a time of flight between a moment when the laser diode 901 emits a laser beam toward a measurement range and a further moment when the photo diode 902 detects the reflected laser beam from the object using the speed of light. The direction of the object is determined by the rotation angle of the motor 905.

The laser diode 901 emits the laser beam having a predetermined diffusion angle. The optical isolator 902 allows the laser beam emitted from the laser diode 901 to pass. The concave mirror 904 deflects the laser beam injected from the laser diode 901 via the optical isolator 903 toward the measurement range. If an object exists within the measurement range, the reflected laser beam comes back from the object. The reflected laser beam from the object is deflected by the concave mirror 904. Because the concave mirror 904 is arranged with the laser diode 901, the reflected laser beam from the object is deflected by the optical isolator 903 toward the photo diode 902.

The laser diode 901, the photo diode 902, the optical isolator 903, the concave mirror 904, and the motor 905 are housed inside the cover case 907 having the optical window 906. The laser beam is emitted to the measurement range and is reflected back by the object located in the measurement range via the optical window 906.

In the apparatus 900, the attenuation of the laser beam is necessarily caused during both the transmission and the reflection of the laser beam through and by the optical isolator, respectively.

In contrast to the case of the apparatus 900, the laser radar apparatus 100 does not use the optical isolator.

As explained so far, in the laser radar apparatus 100, there is the mirror 30 which is arranged at a predetermined angle, for example, at an angle of about 45 degrees with respect to the axis of the outgoing laser beam L0. Further, the mirror 30 has the through-hole 32 through which the outgoing laser beam L0 passes without any loss of intensity. Further, the mirror 30 has the reflection plate 31 that reflects the incoming laser beam L3 toward the photo diode 20. Therefore, the mirror 30 of the laser radar apparatus 100 according to the present invention improves the optical loss characteristics thereof during the emission of the outgoing laser beam L0 and the reflection of the incoming laser beam L3. As a result of this improvement of the optical loss characteristics of the mirror 30, the accuracy of detecting the distance of an object from the apparatus 100 is also improved effectively. In particular, in the present embodiment in which the through-hole 32 of the mirror 30 is empty, the loss or the attenuation of the outgoing laser beam L0 which caused during traveling through the mirror 30 is effectively improved. Further, the incoming laser beam L3 is reflected from the reflection plane 31 of the mirror 30 in the present embodiment. Therefore, nearly prefect reflection of the incoming laser beam L3 from the reflection plane 31 of the mirror 30 can be realized, in spite of the fact that some loss of the intensity of the incoming laser beam L3 is caused due to the through-hole 32 and it is impossible to realize nearly prefect reflection in the optical isolator. Therefore, the attenuation of the incoming laser beam L3 which caused during traveling in the apparatus 100 is effectively improved.

Further, in the present embodiment, the through-hole 32 of the mirror is designed such that the projected image of the through-hole 32 has the circular shape having the center at a point X1, if the through-hole 32 is projected to a plane perpendicular to the axis of the outgoing laser beam L0, as shown in FIG. 3. Hence, the central part of the outgoing laser beam L0 which has the maximum intensity of light pass through the through-hole 32 without any loss of the intensity. Therefore, it is possible to effectively improve the optical loss characteristics of the apparatus 100.

Further, in the present embodiment, there is the optical lens 60 that is located between the laser diode 10 and the through-hole 32 of the mirror 30 and is arranged to be coaxial with the axis of the outgoing laser beam L0. Thus, during passing through the through-hole 32 of the mirror 30, the outgoing laser beam L0 is constituted of the parallel ray of laser pulses not having a diffusion angle, because the diffusive laser beam pulses emitted from the laser diode 10 are converted to the parallel laser pulses L0 by the optical lens 60. This fact results in the minimum diameter D1 of the through-hole 32 and the optical loss characteristics of the mirror 30 in reflecting the incoming laser beam L3 being improved. Therefore the loss of intensity of the incoming laser beam L3 caused by being reflected by the mirror 30 can be minimized.

If a projection optical system is defined as an assembly including the laser diode 10, the motor 50, the optical lens 60, the mirror 30, and the concave mirror 401 and a photo detecting system is defined as an assembly including the concave mirror 401, the mirror 30, the motor 50, and the photo diode 20, the laser radar apparatus 100 according to the present embodiment has improved the beam splitting efficiency and improved detection accuracy of direction and the distance to an object without sacrificing the small size of the laser radar apparatus due to the coaxial structure of the projection optical system and the photo detecting system.

Second Embodiment

Referring to FIGS. 4-7, a laser radar apparatus according to a second embodiment of the present invention will be described.

Figure 4:
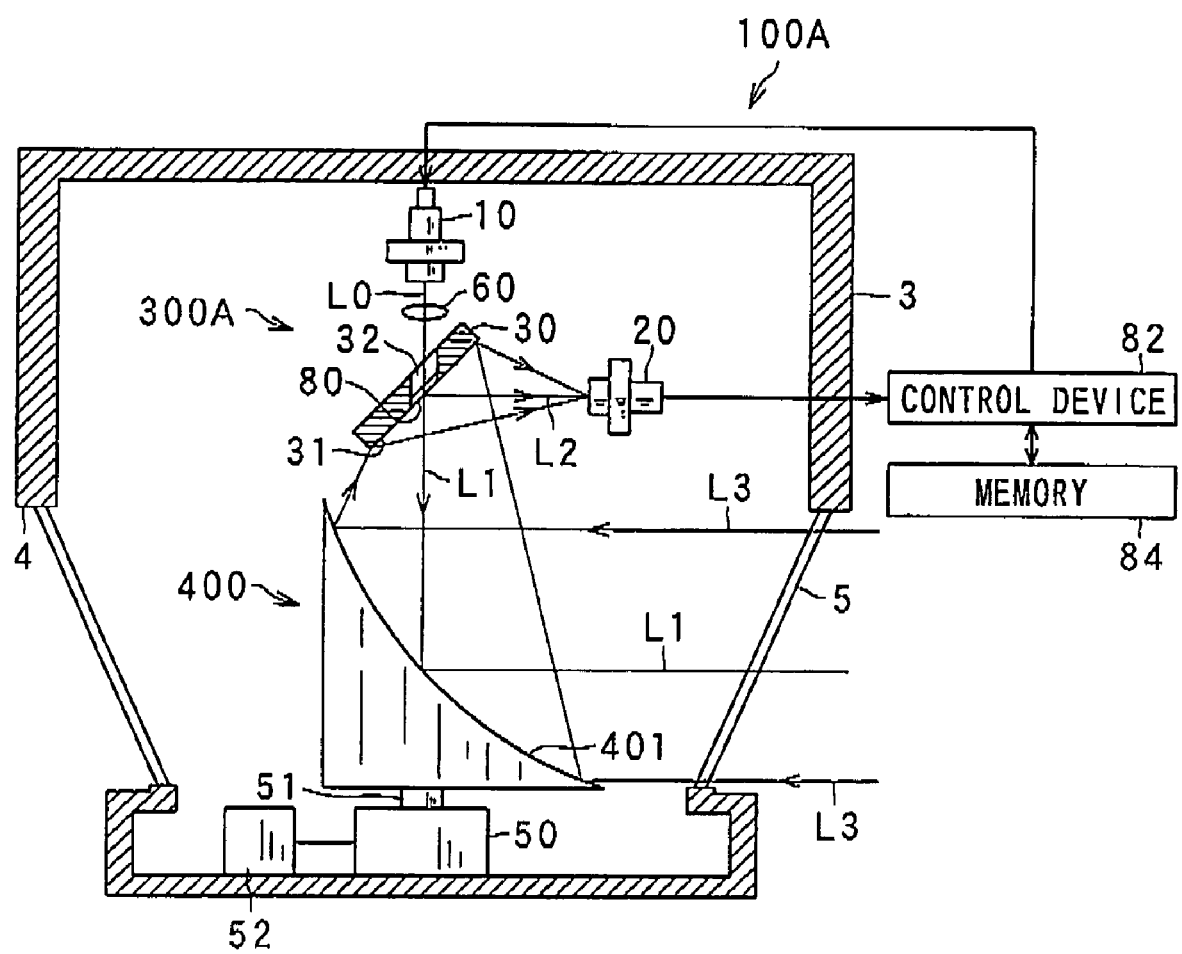
FIG. 4 is a schematic view of a laser radar apparatus according to a second embodiment of the present invention.

FIG. 4 is a schematic view of the laser radar apparatus 100A according to the second embodiment of the present invention.

In the present embodiment, the differences from the previous embodiment are based on the presence of beam splitting means 80 and an improved method for operating a control device 82 and a memory 84. Thus, detailed discussion about the constituents of the laser radar apparatuses having the same function and the structure with those used in previous embodiment will be omitted.

As shown in FIG. 4, the laser radar apparatus 100A according to the present embodiment includes a mirror assembly 300A, a control device 82, and a memory 84. The control device 82 and the memory 84 correspond to control means and memorizing means, respectively. In the present embodiment, the projection optical system includes the laser diode 10 serving as an element of the laser beam generating means, the motor 50 serving as the rotation driving means, the optical lens 60 serving as collimating means, the mirror assembly 300A, and the concave mirror 401 serving as the light deflecting means and the photo detecting system including the concave mirror 401 serving as the light deflecting means, the mirror assembly 300A, the photo diode 20 serving as the element of the photo detecting means, and the motor 50 serving as the rotation driving means.

The mirror assembly 300A includes the mirror 30 and a half-silvered mirror 80.

As in the case of the first embodiment, the mirror 30 is arranged at a predetermined angle, for example, at an angle of about 45 degrees with respect to the axis of the outgoing laser beam L0. Further, the mirror 30 has a through-hole 32 through which the outgoing laser beam L0 passes without any loss of the intensity thereof. The half-silvered mirror 80 covers the through-hole 32 at least in part. Further, the mirror 30 has the reflection plate 31 that reflects the incoming laser beam L3 toward the photo diode 20. The outgoing laser beam L0 transmits the half-silvered mirror 80 of the mirror assembly 300A. The half-silvered mirror 80 splits the outgoing laser beam L0 into a first outgoing laser beam L1 and a second outgoing laser beam L2. That is, a part of the outgoing laser beam L0 transmits the half-silvered mirror 80 of the mirror assembly 300A, although the incoming laser beam L3 is deflected by the mirror 30. The first outgoing laser beam L1 has the same axis of the outgoing laser beam L0 after transmission by the mirror assembly 300A. The mirror 30 is substantially formed as a plate having two surfaces. The mirror 30 has a reflection plane 31 which corresponds to one of the surfaces of the mirror 30 and the through-hole 32. The reflection plane 31 is arranged at a predetermined angle to the axis of the outgoing laser beam L0. The through-hole 32 has a center axis thereof and pierces the mirror 30 such that the center axis of the through-hole 32 crosses a surface of the reflection plate 31.

Further, similar to the case of the first embodiment, the rotary device 400 is arranged to be rotatable around a rotation axis which is identical with the axis of the first outgoing laser beam L1 so that an angular scanning range in the horizontal direction can be realized to be of up to 360 degrees. The rotary device 400 includes the concave mirror 401 that deflects the first outgoing laser beam L1 toward the measurement range and the incoming laser beam L3 reflected back by the object toward the mirror 30. The concave mirror 401 has a focal point on the rotation axis of the rotary device 400.

In contrast to the case of the first embodiment, the mirror assembly 300A includes the half-silvered mirror 80 that serves as the beam splitting means. The half-silvered mirror 80 is arranged to be coaxial with the axis of the outgoing laser beam L0, that is with the axis of the through-hole 32.

Figure 5:
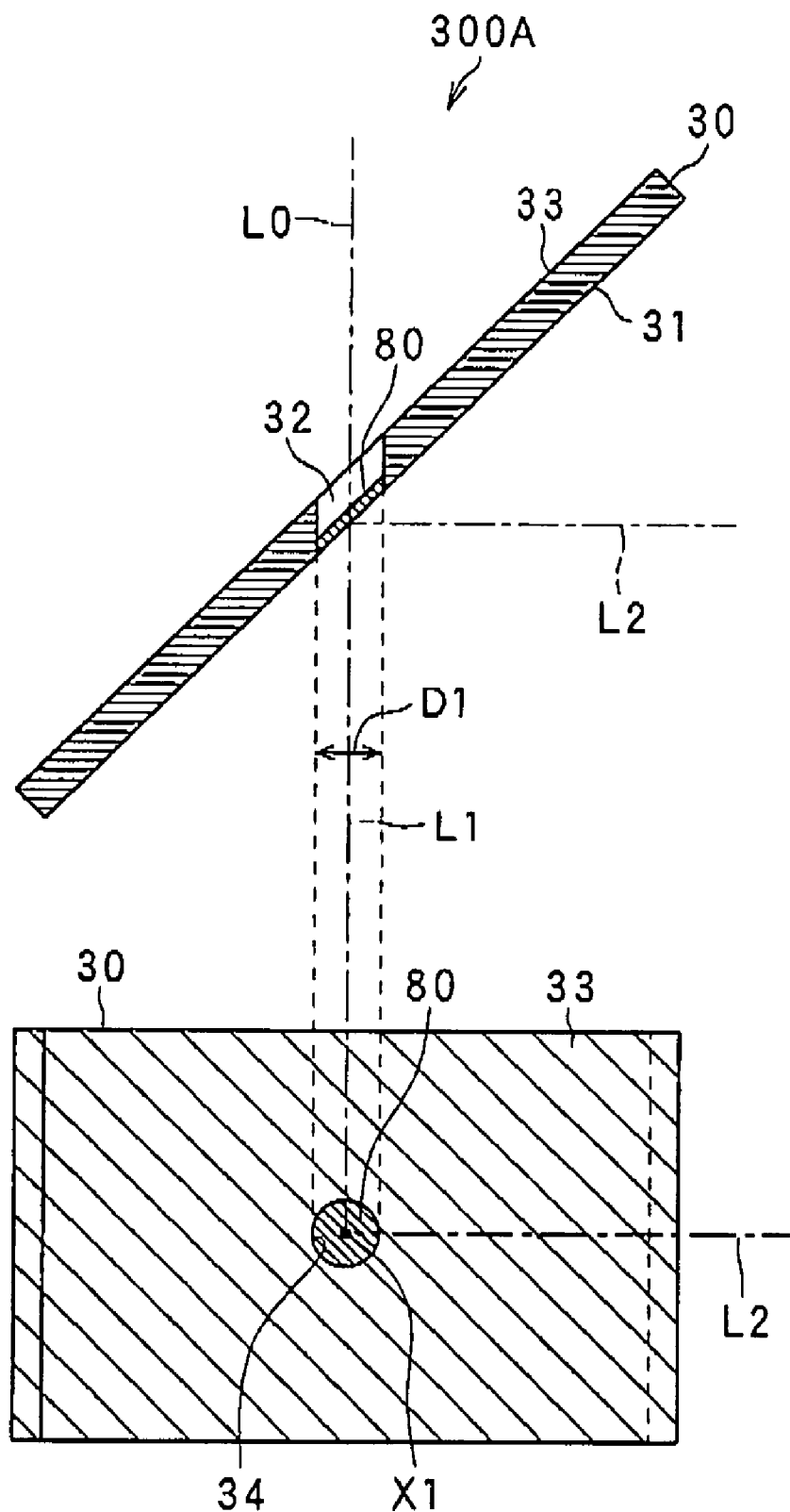
FIG. 5 is a cross sectional view and a bottom view of a mirror assembly of the laser radar including a half-silvered mirror according to the second embodiment shown in FIG. 4.

FIG. 5 is a cross sectional view and a bottom view of the mirror assembly 300A of the laser radar having the half-silvered mirror 80 according to the second embodiment shown in FIG. 4.

As shown in FIG. 5, the mirror assembly 300A according to the present embodiment splits the outgoing laser beam L0 into the first outgoing laser beam L1 and the second outgoing laser beam L2. The directions of the first outgoing laser beam L1 and the second outgoing laser beam L2 are different from each other. The first outgoing laser beam L1 has the same optical path with the outgoing laser beam L0 of the first embodiment. That is, the first outgoing laser beam L1 enters to the concave mirror 401.

As shown in FIG. 5, the through-hole 32 is formed in the shape of the tube having an axis. The axis of the through-hole 32 is coincident with that of the outgoing laser beam L0. This means that the axis of the through-hole 32 is coincident with that of the first outgoing laser beam L1. The through-hole 32 has a circular shaped cross section 34 along its axis. That is, if the through-hole 32 is projected on a plane perpendicular to the axis of the first outgoing laser beam L1 as shown in FIG. 5, the projected image of the through-hole 32 is a circle 34 having its center at a point X1 that is the center of the cross section of the first outgoing laser beam L1. The through-hole 32 has a constant diameter D1. It is allowed that the through-hole 32 has other shaped cross section such as an ellipse shaped one or the like.

The half-silvered mirror 80 covers the through-hole 32. In this embodiment, as shown in FIG. 5, the projected image of the half-silvered mirror 80 that is obtained by projecting the silvered mirror 80 onto the plane perpendicular to the axis of the first outgoing laser beam L1 has a circular shape. That is, the silvered mirror 80 has a substantially elliptic shape because an ellipse arranged to be tilted in this manner has a circular projected image when the ellipse is projected onto the horizontal plane.

Further, the second outgoing laser beam L2 split by the half-silvered mirror 80 are directed to the photo diode 20 and is detected by the photo diode 20 to measure the intensity thereof. The intensity of the second outgoing laser beam L2 detected by the photo diode 20 is correlated to that of the outgoing laser beam L0 emitted from the laser diode 10. Hence if a feedback control operation is applied to control the laser diode 10, the intensity of the outgoing laser beam L0 is adjusted to a suitable value. In this embodiment, the control device 82 and the memory 84 carry out the feedback control operation for controlling the laser diode 10.

The control device 82 can be constructed by a microcomputer that has a central processing unit (CPU). The memory 84 can be constructed by a memory such as a read only memory (ROM), a random access memory (RAM), a non-volatile memory and the like. The control device 82 and the memory 84 are constituents of an example of output intensity adjusting means that adjusts the output intensity of the outgoing laser beam L0 from the laser diode 10.

The control device 82 carries out the feedback control operation defined by a computer program stored in the memory 84. The feedback control operation comprises steps of estimating the output intensity of the outgoing laser beam L0 from the laser diode 10 based on the intensity of the second outgoing laser beam L2, comparing the output intensity of the outgoing laser beam L0 with a reference value, and correcting the output intensity of the outgoing laser beam L0. The feedback control operation is started at a predetermined interval or only when a predetermined condition occurs, for example, when an operator of the apparatus 100A turns on a switch that controls the apparatus.

Figure 6:
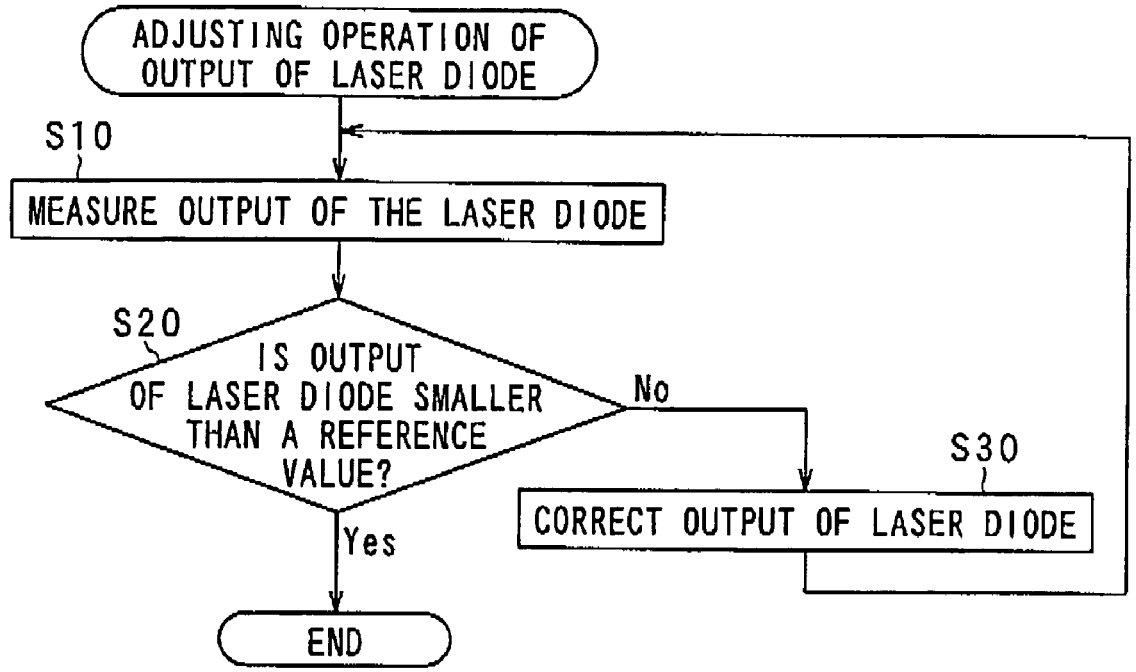
FIG. 6 is a flow chart for explaining the feedback control operation of a laser diode performed by a laser-output control means that adjusts the output intensity of a laser beam from the laser diode of the laser radar shown in FIG. 4.

FIG. 6 is a flow chart for explaining the feedback control operation of the laser diode 10 performed by the control device 82 and the memory 84 which adjust the output intensity of the outgoing laser beam L0 from the laser diode 10.

In step S10, the output intensity of the outgoing laser beam L0 from the laser diode 10 is estimated. In more detail, because the intensity of the second outgoing laser beam L2 detected by the photo diode 20 is correlated to the output intensity of the outgoing laser beam L0 emitted from the laser diode 10, the output intensity of the outgoing laser beam L0 from the laser diode 10 can be obtained based on the intensity of the second outgoing laser beam L2 detected by the photo diode 20.

Next, in step S20, the estimated value of the output intensity of the outgoing laser beam L0 from the laser diode 10 is compared with the reference value. More explicitly, it is determined whether or not the intensity of the second outgoing laser beam L2 detected by the photo diode 20 is larger than a threshold value. The threshold value of the intensity of the second outgoing laser beam L2 depends on the reference value of the output intensity of the outgoing laser beam L0. In general, it is expected that the output intensity of the outgoing laser beam L0 from the laser diode 10 is proportional to the intensity of the second outgoing laser beam L2 detected by the photo diode 20. In other words, it is expected that if the intensity of the second outgoing laser beam L2 is larger than the threshold value, the output intensity of the outgoing laser beam L0 is larger than the reference value. Thus, if the output intensity of the outgoing laser beam L0 is larger than the reference value, the determination in the step S20 is concluded to be "NO", and the procedure proceeds to step S30.

In step S30, the output intensity of the outgoing laser beam L0 is corrected by reducing the amplitude in the command signal that is controlled by the laser diode controlling block 82. The command signal is supplied from a laser diode driving block which is not shown in FIG. 4 and is connected to all of the laser diode 10, the control device 82, and the memory 84. As a result of the operation in this step, the output intensity of the outgoing laser beam L0 is reduced and becomes in an allowable range. Then, the procedure proceeds to the step S10.

In contrast to this case, if the output intensity of the outgoing laser beam L0 is smaller than or equal to the reference value, the determination in the step S20 is "YES" and the feedback control operation of the laser diode 10 is completed.

In the present embodiment, the beam splitting means 80 of the mirror assembly 300A splits the outgoing laser beam L0 into the first outgoing laser beam L1 and the second outgoing laser beam L2. The beam splitting means 80 includes a half-silvered mirror. The first outgoing laser beam L1 enters to the concave mirror 401 although the second outgoing laser beam L2 is directed to the photo diode 20.

Further, the feedback control operation is performed to adjust the output intensity of the outgoing laser beam L0 based on the detected intensity of the second laser beam L2 by the photo diode 20.

Therefore it is possible to properly adjust the output intensity of the outgoing laser beam L0 based on the actual output intensity of the outgoing laser beam L0. Further, if the beam splitting means 80 is constituted of the half-silvered mirror 80, effective splitting of the outgoing laser beam L0 can be performed. Therefore, the laser radar apparatus 100A according to the present embodiment obtains the improved beam splitting efficiency and improved accuracy of detecting the direction and the distance to an object without sacrificing the small size of the laser radar apparatus due to the coaxial structure of the projection optical system and the photo detecting system.

Modification of the Second Embodiment

Figure 7:
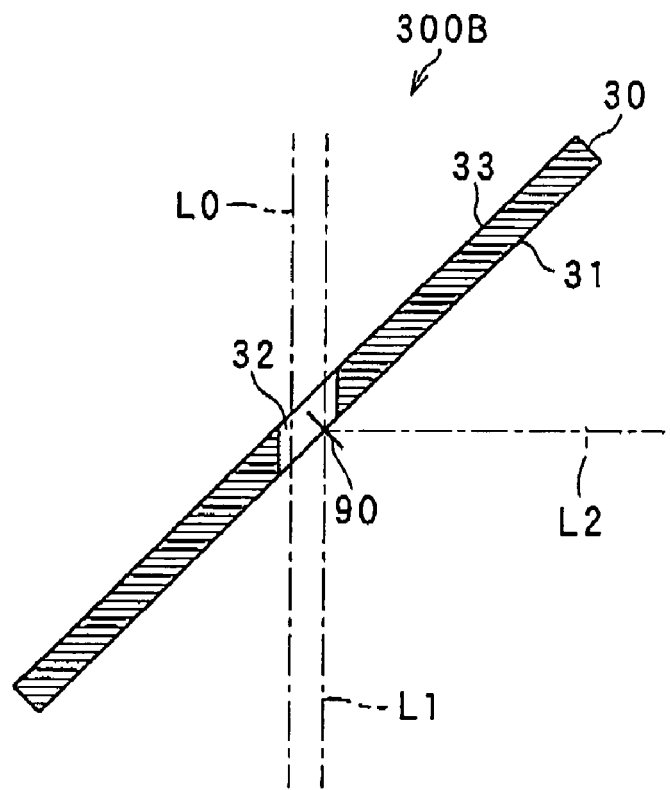
FIG. 7 is a cross sectional view of a mirror of the laser radar according to a modification of the second embodiment.

Referring to FIG. 7, a laser radar apparatus according to a modification of the second embodiment will be explained.

FIG. 7 is a cross sectional view of a mirror assembly 300B according to a modification of the second embodiment.

In the modification of the second embodiment, the only difference from the second embodiment is based on using the mirror assembly 300B instead of the mirror assembly 300A. Thus, detailed discussion about the constituents of the laser radar apparatuses having the same function and the structure with those used in previous embodiments will be omitted.

As shown in FIG. 7, an auxiliary mirror 90 is provided with the mirror assembly 300B to split the outgoing laser beam L0 into the first outgoing laser beam L1 and the second outgoing laser beam L2. In this case, a spectroscopic means includes the auxiliary mirror 90. The auxiliary mirror 90 is arranged to block some part of the outgoing laser beam L0 passed through the through-hole 32 of the mirror 30. Further the auxiliary mirror 90 is joined to the mirror 30 such that the first outgoing laser beam L1 enters to the concave mirror 401 although the second outgoing laser beam L2 is directed to the photo diode 20. Therefore, in the laser radar apparatus according to the modification of the second embodiment, the same advantages with the previous embodiments can be obtained.

Third Embodiment

Figure 8:
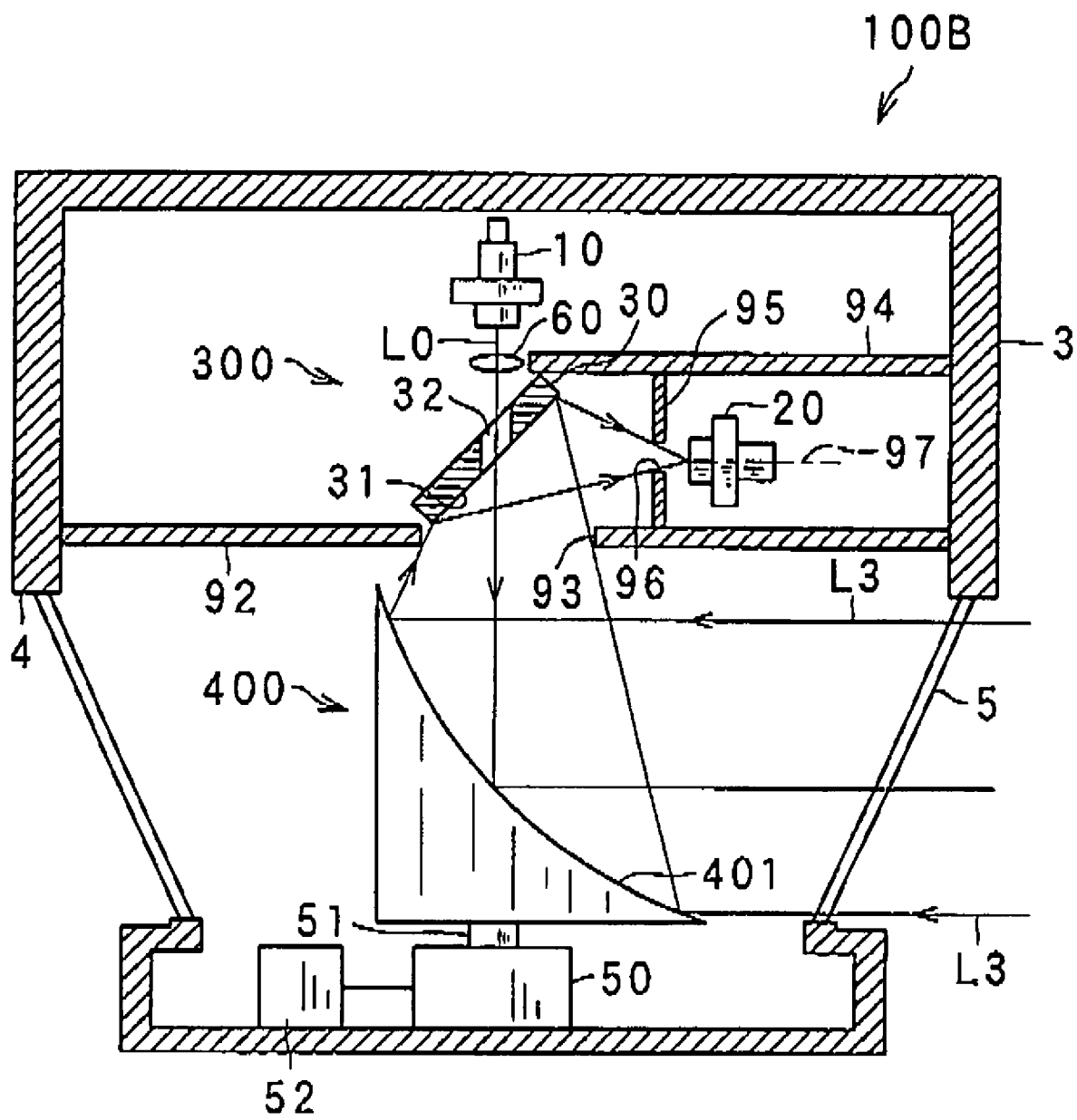
FIG. 8 is a schematic view of a laser radar apparatus according to a third embodiment of the present invention.

Referring to FIG. 8, a laser radar apparatus 100B according to a third embodiment of the present invention will be described.

FIG. 8 is a schematic view of the laser radar apparatus 100B according to the third embodiment of the present invention.

In the present embodiment, the differences from the first embodiment are based on the presence of a first cover member 92 having a first slit 93 and a second cover member 95 having a second slit 96. Thus, detailed discussion about the constituents of the laser radar apparatuses having the same function and structure with those used in the first embodiment will be omitted.

As in the case of the first embodiment, the mirror 30 is arranged at a predetermined angle, for example, of about 45 degrees with respect to the axis of the outgoing laser beam L0. Further, the mirror 30 has the through-hole 32 through which the outgoing laser beam L0 passes without any loss of intensity thereof. Further, the mirror 30 has a reflection plate 31 that reflects the incoming laser beam L3 toward the photo diode 20. The mirror 30 is substantially formed as a plate having two surfaces. The mirror 30 has the reflection plane 31 which corresponds to one of the surfaces of the mirror 30 and the through-hole 32. The reflection plane 31 is arranged at predetermined angle to the axis of outgoing laser beam L0. The through-hole 32 has a center axis thereof and pierces the mirror 30 such that the center axis of the through-hole 32 crosses the surface of the reflection plate 31.

Further, similar to the case of the first embodiment, the rotary device 400 is arranged to be rotatable around a rotation axis which is identical with the axis of the outgoing laser beam L0 so that an angular scanning range in the horizontal direction can be realized to be of up to 360 degrees. The rotary device 400 includes the concave mirror 401 that deflects the outgoing laser beam L0 toward the measurement range and the incoming laser beam L3 reflected back by the object toward the mirror 30. The concave mirror 401 has a focal point on the rotation axis of the rotary device 400.

The laser radar apparatus 100B according to the present embodiment includes the first cover member 92 having the first slit 93, the second cover member 95 having the second slit 96, and a frame member 94 that fix the second cover member 9S.

The first cover member 92 is arranged to be coaxial with the outgoing laser beam L0 and the incoming laser beam L3. In more detail, the first cover member 92 is positioned between the mirror 30 of the mirror assembly 300 and the concave mirror 401. The first cover member 92 is formed to have substantially a plate shape and is fixed to the cover case 3 to keep a constant distance from the first cover member 92 to at least both the laser diode 10 and the motor 50. The inner peripheral wall of the first slit 93 of the first cover member 92 has a cylindrical shape having a center axis thereof. That is, the first slit 93 is a cylindrical-shaped hole formed in the first cover member 92. It is preferable that the center axis of the first slit 93 is in coaxial with the axis of the outgoing laser beam L0. However, it is allowed the center axis of the first slit 93 is parallel to but is deviated from the axis of the outgoing laser beam L0.

The second cover member 95 is arranged to be coaxial with the reflected incoming laser beam L3 from the mirror 30. Thus, the second cover member 95 is positioned between the mirror 30 and the photo diode 20. The second cover member 95 is formed to have substantially a plate shape and is fixed by the frame member 94 and the first cover member 92 that is directly supported by the cover case 3. The second cover member 95 is further fixed so as to keep a relative position to the mirror 30. The inner peripheral wall of the second slit 96 of the second cover member 95 has a cylindrical shape having a center axis thereof. That is, the second slit 96 is a cylindrical-shaped hole formed in the second cover member 95. If an axis 97 of the incoming laser beam traveling between the mirror 30 and the photo diode 20 is defined, the center axis of the slit 95 is in coaxial with the axis 97 of the incoming laser beam traveling between the mirror 30 and the photo diode 20, as shown in FIG. 8.

The laser radar apparatus 100B shown in FIG. 8 includes the first cover member 92 having the first slit 93 and the second cover member 95 having the second slit 96 in addition to the constituents having the mirror assembly 300 included in the laser radar apparatus 100 shown in FIG. 1. However, the mirror assembly 300A shown in FIGS. 4 and 5 can be used instead of the mirror assembly 300 shown in FIGS. 2-3.

In the laser radar apparatus 100B according to the present embodiment, the first cover member 92 having the first slit 93 and the second cover member 95 having the second slit 96 are included. Hence, it is possible to improve the spectral efficiency and the accuracy of detecting the direction and the distance to an object due to blocking the component of the outgoing laser beam L0 and the incoming laser beam L3 that deviated from the proper optical path by the first cover member 92 and the second cover member 95.

Further, due to the cylindrical-shaped first and second slits, 93 and 96, it is possible to obtain the effective blocking characteristics for blocking the component of the outgoing laser beam L0 and the incoming laser beam L3 that deviated from the proper optical path.

Therefore, the laser radar apparatus 100B according to the present embodiment has improved spectral efficiency and improved accuracy of detecting the direction and the distance to an object without sacrificing the small size of the laser radar apparatus due to the coaxial structure of the projection optical system and the photo detecting system. Therefore, in the laser radar apparatus 100B according to the present embodiment, the same advantages with the previous embodiments can be obtained.

Fourth Embodiment

Figure 9:
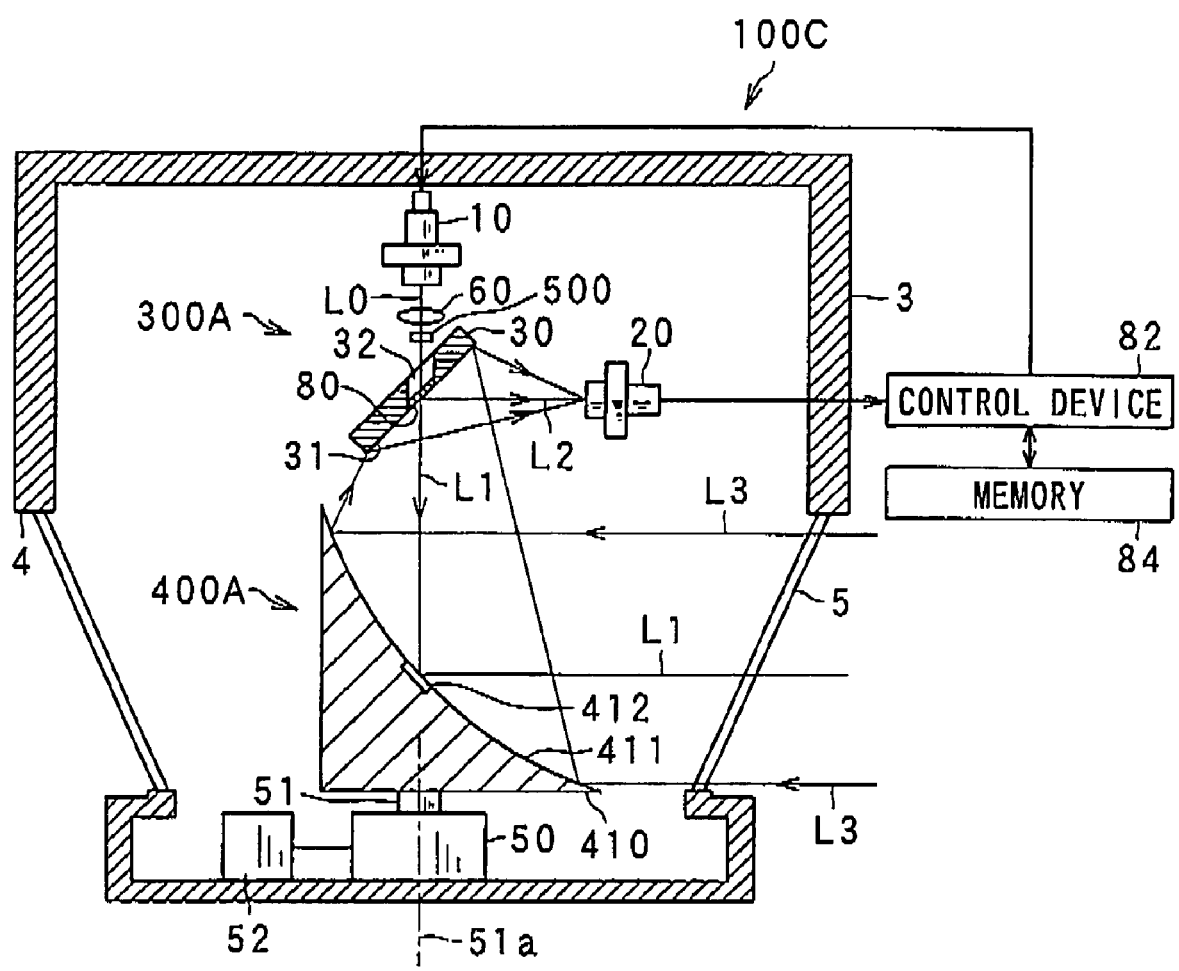
FIG. 9 is a schematic view of a laser radar apparatus according to a fourth embodiment of the present invention.

Referring to FIG. 9, a laser radar apparatus 100C according to a fourth embodiment of the present invention will be described.

FIG. 9 is a schematic view of the laser radar apparatus 100C according to the fourth embodiment of the present invention.

In the present embodiment, the differences from the first embodiment are based on the different structure of a rotary device 400A from the rotary device 30 having a concave mirror 401 shown in FIG. 4 and the presence of an optical element 500 that serves as beam transforming means. The rotary device 400A includes a concave mirror 410 having a concave reflecting portion 411 that has a concave-shaped mirror surface 411a and a flat reflecting portion 412 that has a flat mirror surface 412a. Thus, detailed discussion about the constituents of the laser radar apparatuses having the same function and structure with those used in the second embodiment will be omitted.

As shown in FIG. 9, the laser radar apparatus 100C according to the present embodiment includes the mirror assembly 300A, the control device 82, and the memory 84. In the present embodiment, the projection optical system includes the laser diode 10 serving as the elements of the laser beam generating means, the motor 50 serving as the rotation driving means, the optical lens 60 serving as collimating means, the mirror assembly 300A, and the concave mirror 410 serving as the light deflecting means and the photo detecting system including the concave mirror 410 serving as the light deflecting means, the mirror assembly 300A, the photo diode 20 serving as the element of the photo detecting means, and the motor 50 serving as the rotation driving means.

The mirror assembly 300A includes the mirror 30 and the half-silvered mirror 80.

As already discussed, the mirror 30 is arranged at a predetermined angle, for example, at an angle of about 45 degrees with respect to the axis of the outgoing laser beam L0. Further, the mirror 30 has the through-hole 32 through which the outgoing laser beam L0 passes without any loss of the intensity thereof. Further, the mirror 30 has the reflection plate 31 that reflects the incoming laser beam L3 toward the photo diode 20. The outgoing laser beam L0 transmitted by the mirror 30 to become a first outgoing laser beam L1, although the incoming laser beam L3 is reflected by the mirror 30. The first outgoing laser beam L1 has the same axis of the outgoing laser beam L0 after transmission by the mirror assembly 300A. The mirror 30 is substantially formed as a plate having two surfaces. The mirror 30 has the reflection plane 31 which corresponds to one of the surfaces of the mirror 30 and the through-hole 32. The reflection plane 31 is arranged at predetermined angle to the axis of outgoing laser beam L0. The through-hole 32 has a center axis thereof and pierces the mirror 30 such that the center axis of the through-hole 32 crosses a surface of the reflection plate 31.

The mirror assembly 300A according to the present embodiment splits the outgoing laser beam L0 into the first outgoing laser beam L1 and the second outgoing laser beam L2, as shown in FIG. 5. The directions of the first outgoing laser beam L1 and the second outgoing laser beam L2 are different from each other. The first outgoing laser beam L1 enters to the concave mirror 410. Further, the cover case 3 is provided to house the laser diode 10, the photo diode 20, the mirror assembly 300A, the optical lens 60, and the rotary device 400A. The cover case 3 has an optical window 4 through which the first outgoing laser beam L1 and the incoming laser beam L3 exits the apparatus 100C and enters into the apparatus 100C, respectively. The optical window 4 is covered by the transparent plate 5 such as transparent glass in order to prevent the concave mirror 410 and other elements of the apparatus 100 from being exposed to dust, as in the apparatus 100A according to the second embodiment disclosed above.

Further, the laser radar apparatus 100C according to the present embodiment includes the rotary device 400A. The rotary device 400A is arranged to be rotatable around a rotation axis which is identical with the axis of the first outgoing laser beam L1 so that an angular scanning range in the horizontal direction can be realized to be of up to 360 degrees. The rotary device 400A includes the concave mirror 410 that deflects the first outgoing laser beam L1 toward the measurement range and the incoming laser beam L3 reflected back by the object toward the mirror 30. The concave mirror 410 corresponds to the light deflecting means.

In order to drive the rotary device 400A to execute a continuous rotating movement, the motor 50 is provided. The motor 50 has the output shaft 51 that drives the rotary device 400 and the concave mirror 410. The motor 50 corresponds to the rotation driving means. In order to detect the rotation angle of the motor 50, a rotation angle sensor 52 is provided and is connected to the motor 50.

The structure of the rotary device 400A is different from that of the rotary device 400 disclosed in the first embodiment. That is, contrast to the case of the rotary device 400, the rotary device 400A used in the present embodiment includes the concave mirror 410 whose structure is different from that of the concave mirror 401 shown in FIG. 1. The concave mirror 410 generates a projection pattern of the first outgoing light L1 shown in FIG. 10 from the first outgoing light L1 transmitted through the optical element 500.

Figure 11:
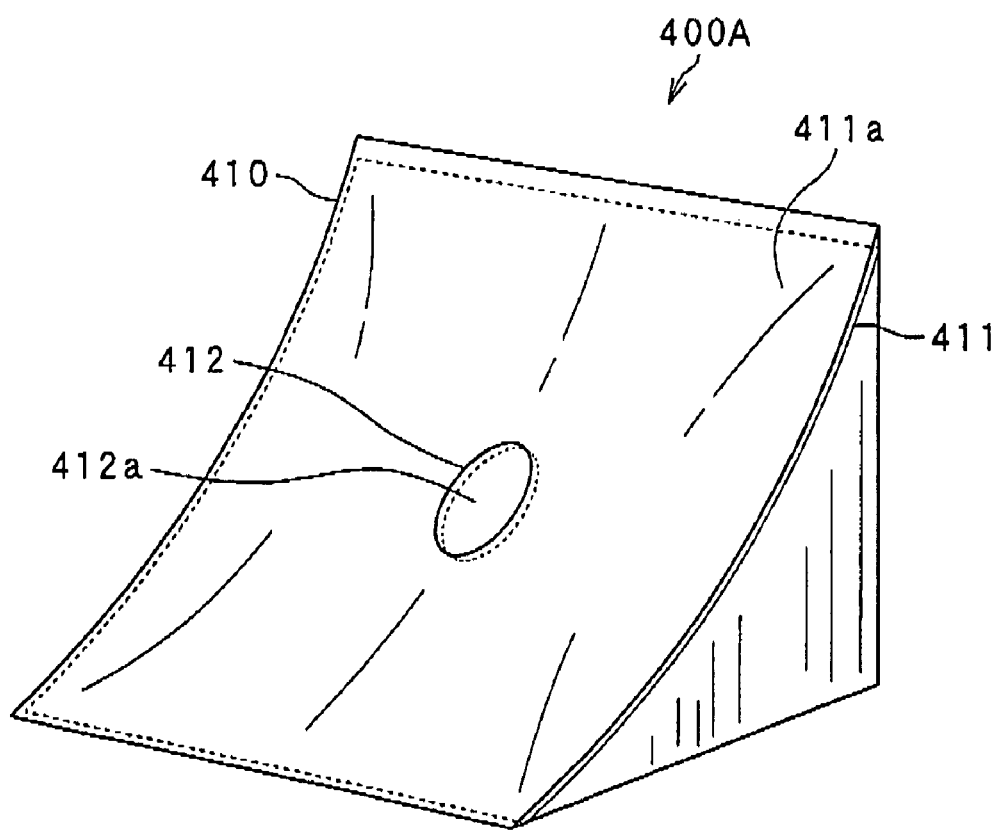
FIG. 11 is a schematic view of the concave mirror used in the laser radar according to the fourth embodiment.

FIG. 11 is a schematic view of the rotary device 400A used in the present embodiment.

As shown in FIG. 11, the rotary device 400A has the concave mirror 410. The concave mirror 410 has the concave reflecting portion 411 that has the concave-shaped mirror surface 411a and a flat reflecting portion 412 that has a flat mirror surface 412a. The surface of the concave mirror 410 is covered by the flat mirror surface 412a of the flat reflecting portion 412 and the concave-shaped mirror surface 411a such that the flat mirror surface 412a is enclosed by the concave-shaped mirror surface 411a. Further the flat mirror surface 412a is configured such that the first outgoing laser beam L1 emitted by the laser diode 10 enters to and is reflected by the flat mirror surface 412a. That is, the flat mirror surface 412a of the concave mirror 410 is arranged to be coaxial with the axis of the first outgoing laser beam L1.

The rotary device 400A has a rotation axis 51a that is defined as the axis of the output shaft 51 of the motor 50. The rotation axis 51a is aligned with the axis of the outgoing laser beam L0 and the first outgoing laser beam L1 between the laser diode 10 and the concave mirror 410. The concave reflecting portion 411 of the concave mirror 410 has a focal point on the rotation axis 51a of the rotary device 400A. Hence, after the incoming laser beam L3 reflected back by the object is reflected by the concave reflecting portion 411 of the concave mirror 410, the incoming laser beam L3 is collected to the focal point positioned on the rotation axis 51a.

Figure 10:
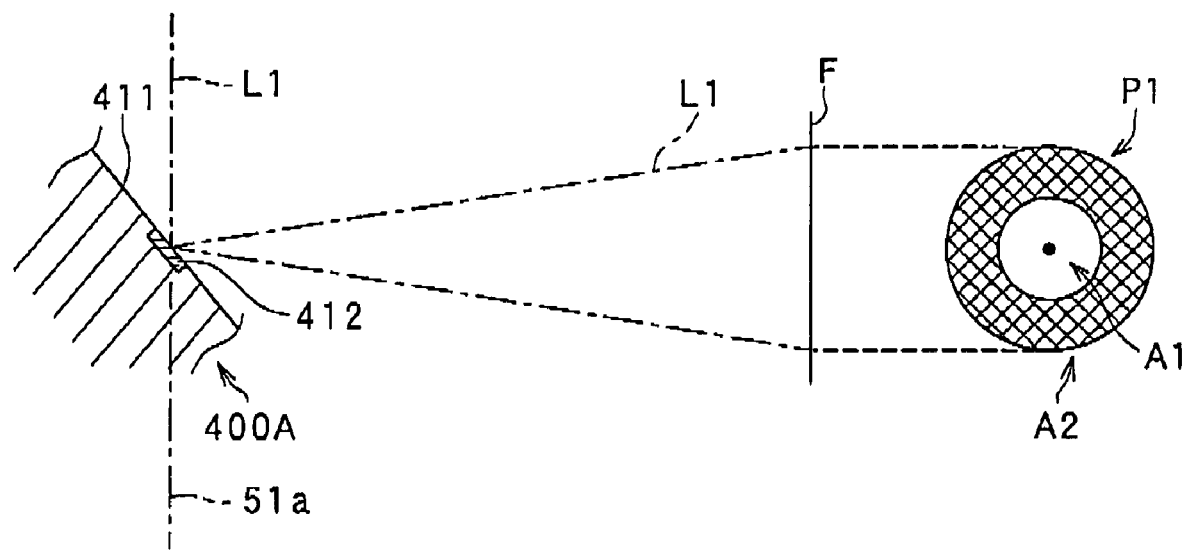
FIG. 10 is a graph illustrating a projection pattern of an outgoing light transmitted through beam transforming means and deflected by a flat reflecting portion of a concave mirror of the laser radar according to a fourth embodiment of the present invention.

As shown in FIG. 10, the image of the flat reflecting portion 412 of the concave mirror 410 projected onto a plane perpendicular to the rotation axis 51a has the shape of circle. That is, when the apparatus 100C having the rotary device 400A is set on the horizontal plane, the first outgoing laser beam L1 exits from the apparatus 100C in the horizontal direction. Thus, if a vertical plane F is prepared in the measuring range, and the first outgoing laser beam L1 is incident on the vertical plane F, the distribution of intensity of the first outgoing laser beam L1 has a circular shape, as shown in FIG. 10.

Further, as shown in FIG. 9, the laser radar apparatus 100C according to the present embodiment includes the optical element 500 that serves as the beam transforming means. The optical element 500 is positioned on the axis of the outgoing laser beam L0 between the laser diode 10 and the measurement range outside the apparatus 100C.

The optical element 500 includes a transmission type diffraction grating. The outgoing laser beam L0 is transmitted through the optical element 500 and is transformed so as to have a predetermined projection pattern that covers a larger cross sectional area than the cross sectional area of the collimated outgoing laser beam L0 by the optical lens 60. The incident laser beam to the optical element 500 is the laser beam of parallel rays collimated by the optical lens 60. In the optical element 500, the incident laser beam is dispersed such that the diameter of the outgoing laser beam L0 is increased by its traveling through the optical element 500. Hence the irradiated area on a target surface of the object located in the measurement range is also enlarged comparing with the case where the optical element 500 is not included.

FIG. 10 is a graph showing an exemplary projection pattern P1 of the first outgoing light L1 generated by the optical element 500 on the vertical plane F.

The projection pattern P1 is obtained when the apparatus 100C having the rotary device 400A is set on the horizontal plane, the first outgoing laser beam L1 exits from the apparatus 100C in the horizontal direction. Thus, if a vertical plane F is prepared in the measuring range, and the first outgoing laser beam L1 is incident on the vertical plane F, the distribution of intensity of the first outgoing laser beam L1 has a circular shape, as shown in FIG. 10

In FIG. 10, a ring-shaped projection pattern P1 generated by the optical element 500 is shown. The ring-shaped projection pattern P1 is drawn on a plane F perpendicular to the axis of the first outgoing laser beam L1 after being deflected by the flat mirror surface 412a of the flat reflecting portion 412. The ring-shaped projection pattern P1 includes a dark area A1 and a bright area A2, wherein a greater intensity of the first outgoing laser beam L1 shines upon the bright area A2 than the dark area A1. The dark area A1 is enclosed by the bright area A2. Other pattern than the ring-shaped projection pattern P1 can be generated by utilizing known spectroscopic techniques.

In the present embodiment, the through-hole 32 has circular shaped cross section which is identical with the axis of the first outgoing laser beam L1, as shown in FIG. 5. That is, if the through-hole 32 is projected to a plane perpendicular to the axis of the first outgoing laser beam L1, the projected image of the through-hole 32 is the circle. It is allowed that the through-hole 32 has other shaped cross section such as an ellipse shaped one or the like.

Further, the mirror assembly 300A includes the half-silvered mirror 80 that serves as the beam splitting means. The half-silvered mirror 80 is arranged to be coaxial with the axis of the outgoing laser beam L0, that is, with the axis of the through-hole 32. The mirror assembly 300A splits the outgoing laser beam L0 into a first outgoing laser beam L1 and a second outgoing laser beam L2. The directions of the first outgoing laser beam L1 and the second outgoing laser beam L2 are different from each other. The first outgoing laser beam L1 has the same optical path with the outgoing laser beam L0 of the first embodiment. That is, the first outgoing laser beam L1 enters to the concave mirror 401. Hence, the feedback control operation can be performed to adjust the output intensity of the outgoing laser beam L0 based on the detected intensity of the second laser beam L2 by the photo diode 20, as shown in FIG. 4.

The laser radar apparatus 100C according to the present embodiment has the same advantages achieved by the previous embodiments. The laser radar apparatus 100C further has the optical element 500 positioned on the axis of the outgoing laser beam L0 between the laser diode 10 and the measurement range. The outgoing laser beam L0 is transmitted through the optical element 500 and is transformed so as to have a predetermined projection pattern that covers a larger cross sectional area than the cross sectional area of the collimated outgoing laser beam L0 by the optical lens 60. Hence, the distribution of the incoming laser beam L3 reflected back by the object can be designed to prevent the incoming laser beam L3 entering the through-hole 32. Therefore, the loss or the attenuation of the incoming laser beam L3 which was caused during traveling through the mirror assembly 300 is effectively countered.

Further, in the laser radar apparatus 100C, the concave mirror 342 having a concave shaped surface that deflects the first outgoing laser beam L1 emitted from the laser diode 10 toward the measurement range outside the apparatus 100C and deflects the incoming laser beam L3 from the object located in the measurement range, if it exists, toward the mirror 30. Thus, the laser radar apparatus 100C according to the present embodiment has improved the beam splitting efficiency and improved accuracy of detecting direction and the distance to an object without sacrificing the small size of the laser radar apparatus. Further, the concave mirror 410 has the flat reflecting portion 412 that has the flat mirror surface 412a that is configured such that the outgoing laser beam L0 emitted by the laser diode 10 enters to and is reflected by the flat mirror surface 412a. Thus, it is possible to prevent diffusion phenomenon from occurring, when the first outgoing laser beam L1 is deflected by the concave mirror 410. Therefore, the laser radar apparatus 100C has the improved beam splitting efficiency and improved accuracy of detecting direction and the distance to an object.

Further, the apparatus 100C includes the optical element 500 positioned on the axis of the outgoing laser beam L0 between the laser diode 10 and the through-hole 32 of the mirror assembly 300A. In this configuration, only the outgoing laser beam L0 enters the optical element 500. That is, the incoming laser beam L3 is not transmitted through the optical element 500. Thus, the optical element 500 does not attenuate the incoming laser beam L3. Therefore, the laser radar apparatus 100C has improved beam splitting efficiency and improved accuracy of detecting the direction and the distance to an object.

Further, the optical element 500 includes the transmission type diffraction grating to generate the predetermined projection pattern of the outgoing laser beam L0. In the optical element 500, the incident laser beam is dispersed such that the diameter of the outgoing laser beam L0 is increased by its traveling through the optical element 500. Hence the irradiated area on a target surface F of the object located in the measurement range is also enlarged comparing with the case where the optical element 500 is not included. Thus, the beam transforming means includes the optical element 500. Hence, the functions of the beam transforming means can be easily and surely realized by the optical element 500.

The predetermined projection pattern of the outgoing laser beam L0 includes a dark area A1 and a bright area A2, wherein a greater intensity of the outgoing laser beam L0 shines upon the bright area A2 than the dark area A1. Thus, the mirror assembly 300A can reduce losses from the incoming laser beam L3 caused by the incoming laser beam L3 passing the through-hole 32. Therefore, the laser radar apparatus 100C has improved beam splitting efficiency and improved accuracy of detecting the direction and the distance to an object.

Further, in the laser radar apparatus 100C according to the present embodiment, the same advantages with the previous embodiments can be obtained.

Fifth Embodiment

Figure 12:
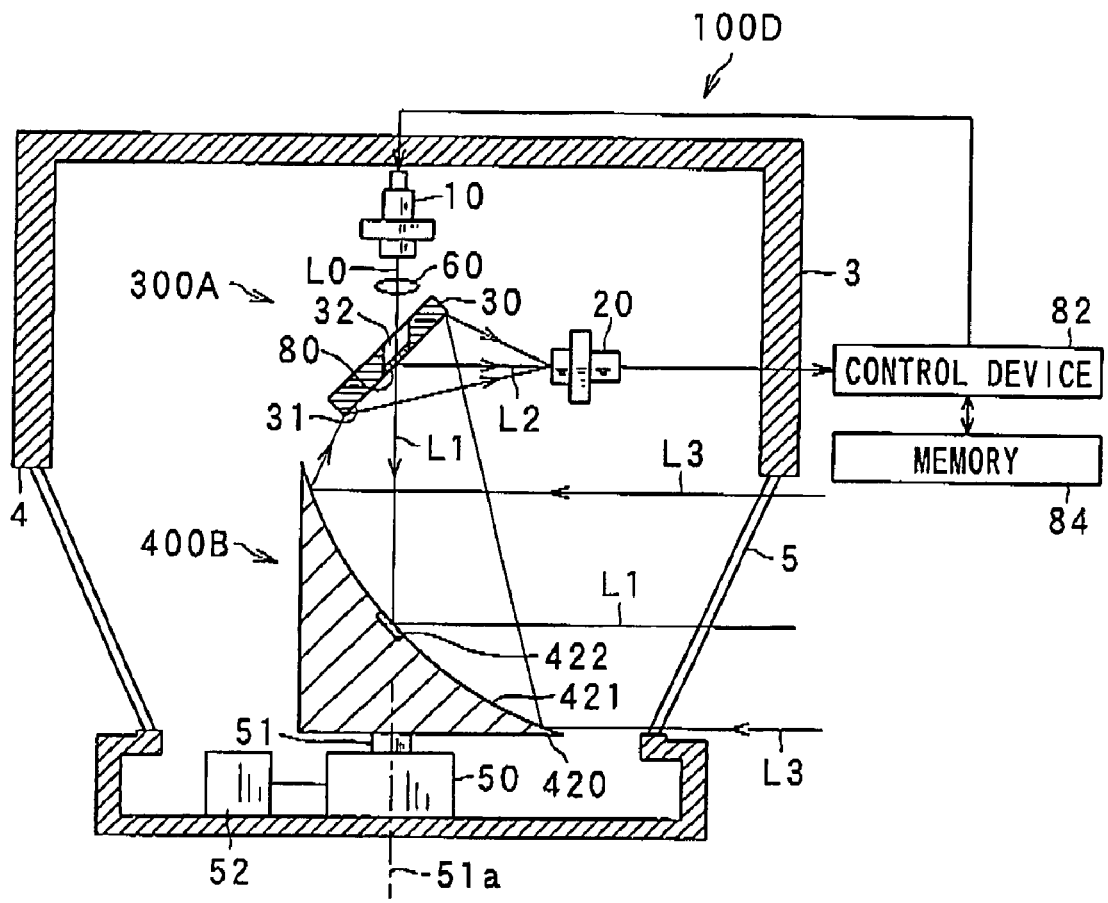
FIG. 12 is a schematic view of a laser radar apparatus according to a fifth embodiment of the present invention.
Figure 13:
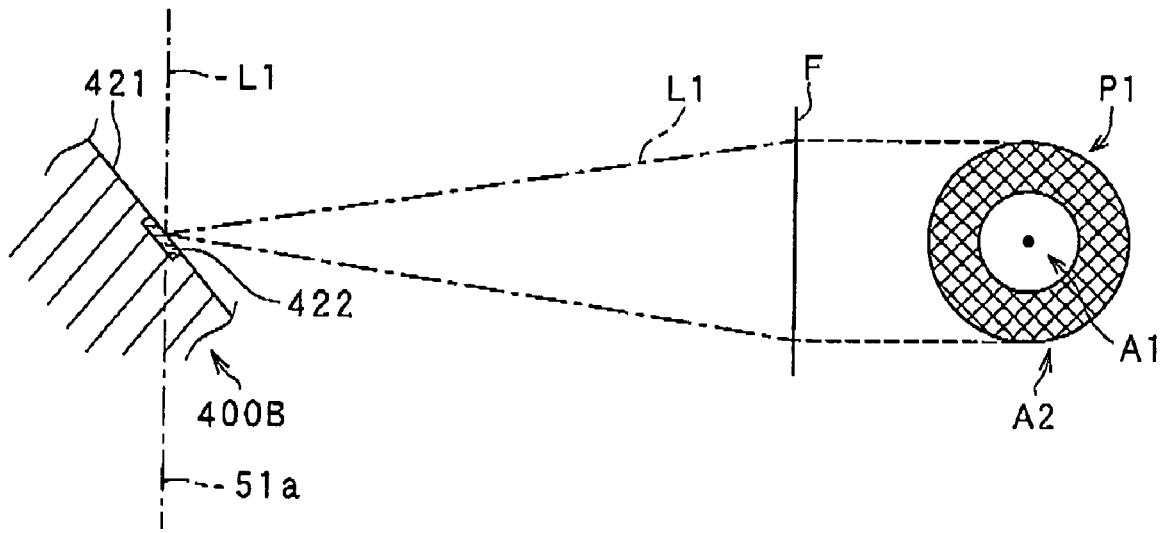
FIG. 13 is a graph illustrating a projection pattern of an outgoing light transmitted through a diffraction grating member and deflected by a planar mirror portion of a concave mirror of the laser radar according to a fifth embodiment of the present invention.

Referring to FIGS. 12-13, a laser radar apparatus 100D according to a fifth embodiment of the present invention will be described.

FIG. 12 is a schematic view of the laser radar apparatus 100D according to the fifth embodiment of the present invention.

In the present embodiment, the differences from the first embodiment are based on the different structure of a rotary device 400B from the rotary device 400A used in the fourth embodiment and the absence of an optical element 500 that serves as a beam transforming means that is included in the apparatus 100C. The rotary device 400B has a concave mirror 420. Thus, detailed discussion about the constituents of the laser radar apparatuses having the same function and structure with those used in the fourth embodiment will be omitted.

As shown in FIG. 12, the laser radar apparatus 100D according to the present embodiment includes the mirror assembly 300A, the control device 82, and the memory 84. In the present embodiment, the projection optical system includes the laser diode 10 serving as the elements of the laser beam generating means, the motor 50 serving as the rotation driving means, the optical lens 60 serving as laser beam collimating means, the mirror assembly 300A, and the concave mirror 420 serving as the light deflecting means, and the photo detecting system includes the concave mirror 420 serving as the light deflecting means, the mirror assembly 300A, the photo diode 20 serving as the element of the photo detecting means, and the motor 50 serving as the rotation driving means.

The mirror assembly 300A includes the mirror 30 and the half-silvered mirror 80.

As in the case of the first embodiment, the mirror 30 is arranged at a predetermined angle, for example, at an angle of about 45 degrees with respect to the axis of the outgoing laser beam L0. Further, the mirror 30 has the through-hole 32 through which the outgoing laser beam L0 passes without any loss of the intensity thereof. Further, the mirror 30 has the reflection plate 31 that reflects the incoming laser beam L3 toward the photo diode 20. The outgoing laser beam L0 is transmitted by the mirror assembly 300A to become a first outgoing laser beam L1, although the incoming laser beam L3 is reflected by the mirror 30 of the mirror assembly 300A. The first outgoing laser beam L1 has the same axis of the outgoing laser beam L0 after transmission of the mirror assembly 300A. The mirror 30 is substantially formed as a plate having two surfaces. The mirror 30 has the reflection plane 31 which corresponds to one of the surfaces of the mirror 30 and the through-hole 32. The reflection plane 31 is arranged at predetermined angle to the axis of outgoing laser beam L0. The through-hole 32 has a center axis thereof and pierces the mirror 30 such that the center axis of the through-hole 32 crosses a surface of the reflection plate 31.

The mirror assembly 300A according to the present embodiment splits the outgoing laser beam L0 into the first outgoing laser beam L1 and the second outgoing laser beam L2. The directions of the first outgoing laser beam L1 and the second outgoing laser beam L2 are different from each other. The first outgoing laser beam L1 has the same optical path with the outgoing laser beam L0 of the first embodiment. That is, the first outgoing laser beam L1 enters to the concave mirror 420. Further, the cover case 3 is provided to house the laser diode 10, the photo diode 20, the mirror assembly 300, the optical lens 60, and the rotary device 400B. The cover case 3 has an optical window 4 through which the outgoing laser beam L0 and the incoming laser beam L3 exits the apparatus 100D and enters into the apparatus 100D, respectively. The optical window 4 is covered by the transparent plate 5 such as a transparent glass in order to prevent the concave mirror 420 and other elements of the apparatus 100 from being exposed to dust, as in the apparatus 100A according to the second embodiment disclosed above.

Further, the laser radar apparatus 100D according to the present embodiment includes the rotary device 400B. The rotary device 4005 is arranged to be rotatable around a rotation axis which is identical with the axis of the first outgoing laser beam L1 so that an angular scanning range in the horizontal direction can be realized of up to 360 degrees. The rotary device 400B includes the concave mirror 420 that deflects the first outgoing laser beam L1 toward the measurement range and the incoming laser beam L3 reflected back by the object toward the mirror 30. The concave mirror 420 corresponds to light deflecting means.

In order to drive the rotary device 400B to execute the continuous rotating movement, the motor 50 is provided. The motor 50 has the output shaft 51 that drives the rotary device 400B and the concave mirror 420. The motor 50 corresponds to rotation driving means. In order to detect the rotation angle of the motor 50, a rotation angle sensor 52 is provided and is connected to the motor 50.

The concave mirror 420 has a concave reflecting portion 421 that has a concave-shaped mirror surface 421a and a flat reflecting portion 422 that has a flat mirror surface 422a. The surface of the concave mirror 420 is covered by the flat mirror surface 422a of the flat reflecting portion 422 and the concave-shaped mirror surface 421a such that the flat mirror surface 422a is enclosed with the concave-shaped mirror surface 421a. Further the flat mirror surface 422a is configured such that the first outgoing laser beam L1 enters to and is reflected by the flat mirror surface 422a. That is, the flat mirror surface 422a of the concave mirror 420 is arranged to be coaxial with the axis of the first outgoing laser beam L1.

The rotary device 400B has the rotation axis 51a that is defined as the axis of the output shaft 51 of the motor 50. The rotation axis 51a agrees with the axis of the outgoing laser beam L0 and the first outgoing laser beam. L1 between the laser diode 10 and the concave mirror 420. The concave reflecting portion 421 of the concave mirror 401 has a focal point on the rotation axis 51a of the rotary device 400B. Hence, after the incoming laser beam L3 reflected back by the object is deflected by the concave reflecting portion 421 of the concave mirror 420, the incoming laser beam L3 is collected at the focal point positioned on the rotation axis 51a.

Further, in the laser radar apparatus 100D according to the present embodiment, the flat reflecting portion 422 of the concave mirror 420 includes a reflection type diffraction grating. The flat reflecting portion 422 reflects the first outgoing laser beam L1 toward the measurement range and transforms the first outgoing laser beam L1 so as to generate a predetermined projection pattern that covers a larger cross sectional area than the cross sectional area of the collimated outgoing laser beam L0 by the optical lens 60. The incident laser beam L1 to the flat reflecting portion 422 is the laser beam of parallel rays collimated by the optical lens 60. The incident laser beam is dispersed such that the diameter of the outgoing laser beam L0 is increased by its reflection by the flat reflecting portion 422.

FIG. 13 is a graph showing an exemplary projection pattern P1 of the first outgoing light L1 generated by the flat reflecting portion 422 including the reflection type diffraction grating.

The projection pattern P1 is obtained when the apparatus 100D having the rotary device 400B is set on the horizontal plane, the first outgoing laser beam L1 exits from the apparatus 100D in the horizontal direction. Thus, if a vertical plane F is prepared in the measuring range, and the first outgoing laser beam L1 is incident on the vertical plane F, the distribution of intensity of the first outgoing laser beam L1 has a circular shape, as shown in FIG. 13

In FIG. 13, a ring-shaped projection pattern P1 generated by the flat reflecting portion 422 is shown. The ring-shaped projection pattern P1 is drawn on a plane F perpendicular to the axis of the first outgoing laser beam L1 after being deflected by the flat mirror surface 422a of the flat reflecting portion 422. The ring-shaped projection pattern P1 includes a dark area A1 and a bright area A2, wherein a greater intensity of the first outgoing laser beam L1 shines upon the bright area A2 than the dark area A1. The dark area A1 is enclosed by the bright area A2, similar to the case shown in FIG. 10.

The laser radar apparatus 100D according to the present embodiment has the same advantages achieved by the previous embodiments. The laser radar apparatus 100D further has the flat reflecting portion 422 of the concave mirror 420 including the reflection type diffraction grating. The flat reflecting portion 422 positioned on the axis of the outgoing laser beam L0 between the laser diode 10 and the measurement range. The first outgoing laser beam L1 is deflected by the flat reflecting portion 422 of the concave mirror 420 and is transformed so as to have a predetermined projection pattern that covers a larger cross sectional area than the cross sectional area of the collimated outgoing laser beam L0 by the optical lens 60. Hence, the distribution of the incoming laser beam L3 reflected back by the object can be designed to prevent the incoming laser beam L3 entering the through-hole 32. Therefore, the loss or the attenuation of the incoming laser beam L3 which was caused during traveling through the mirror assembly 300A is effectively improved.

Further, in the laser radar apparatus 100D, the concave mirror 442 serving as an object having a concave shaped surface reflects the outgoing laser beam L0 emitted from the laser diode 10 toward the measurement range outside the apparatus 100D and deflects the incoming laser beam L3 from the object located in the measurement range, if it exists, toward the mirror 30. Thus, the laser radar apparatus 100D according to the present embodiment has improved beam splitting efficiency and improved accuracy of detecting the direction and the distance to an object without sacrificing the small size of the laser radar apparatus. Further, the concave mirror 420 has the flat reflecting portion 422 that has the flat mirror surface 422a that is configured such that the first outgoing laser beam L1 emitted by the laser diode 10 and split by the half-silvered mirror 80 enters to and is reflected by the flat mirror surface 422a. Thus, it is possible to prevent from causing beam diffusion during the outgoing laser beam L0 being reflected by the concave mirror 420. Therefore, the laser radar apparatus 100D has improved beam splitting efficiency and improved accuracy of detecting the direction and the distance to an object.

Further, in the present embodiment, the flat reflecting portion 422 includes the reflection type diffraction grating that transforms the laser beam to have the predetermined projection pattern. In this configuration, there is need to provide any optical element such as the optical element 500 shown in FIG. 9 between the mirror assembly 300A and the measurement range via the concave mirror 420. Thus, it is possible to reduce the size of the laser radar apparatus. Therefore, the laser radar apparatus 100D according to the present embodiment has improved beam splitting efficiency and improved accuracy of detecting the direction and the distance to an object without sacrificing the small size of the laser radar apparatus.

Further, the flat reflecting portion 422 includes the reflection type diffraction grating to generate the predetermined projection pattern of the first outgoing laser beam L1. In the flat reflecting portion 422, the incident laser beam is dispersed such that the diameter of the outgoing laser beam L0 is increased. Hence the irradiated area on a target surface F of the object located in the measurement range is also enlarged comparing with the case where the optical element 500 is not included. The beam transforming means includes the flat reflecting portion 422. Therefore, the functions of the beam transforming means can be easily and surely realized by the flat reflecting portion 422.

The predetermined projection pattern P1 of the first outgoing laser beam L1 includes a dark area A1 and a bright area A2, wherein a greater intensity of the first outgoing laser beam L1 shines upon the bright area A2 than the dark area A1. Thus, the mirror assembly 300A can reduce the loss of the incoming laser beam L3 generated by the incoming laser beam L3 passing the through-hole 32. Therefore, the laser radar apparatus 100D has improved beam splitting efficiency and improved accuracy of detecting the direction and the distance to an object.

Further, in the laser radar apparatus 100D according to the present embodiment, the same advantages with the previous embodiments can be obtained.

Sixth Embodiment

Figure 14:
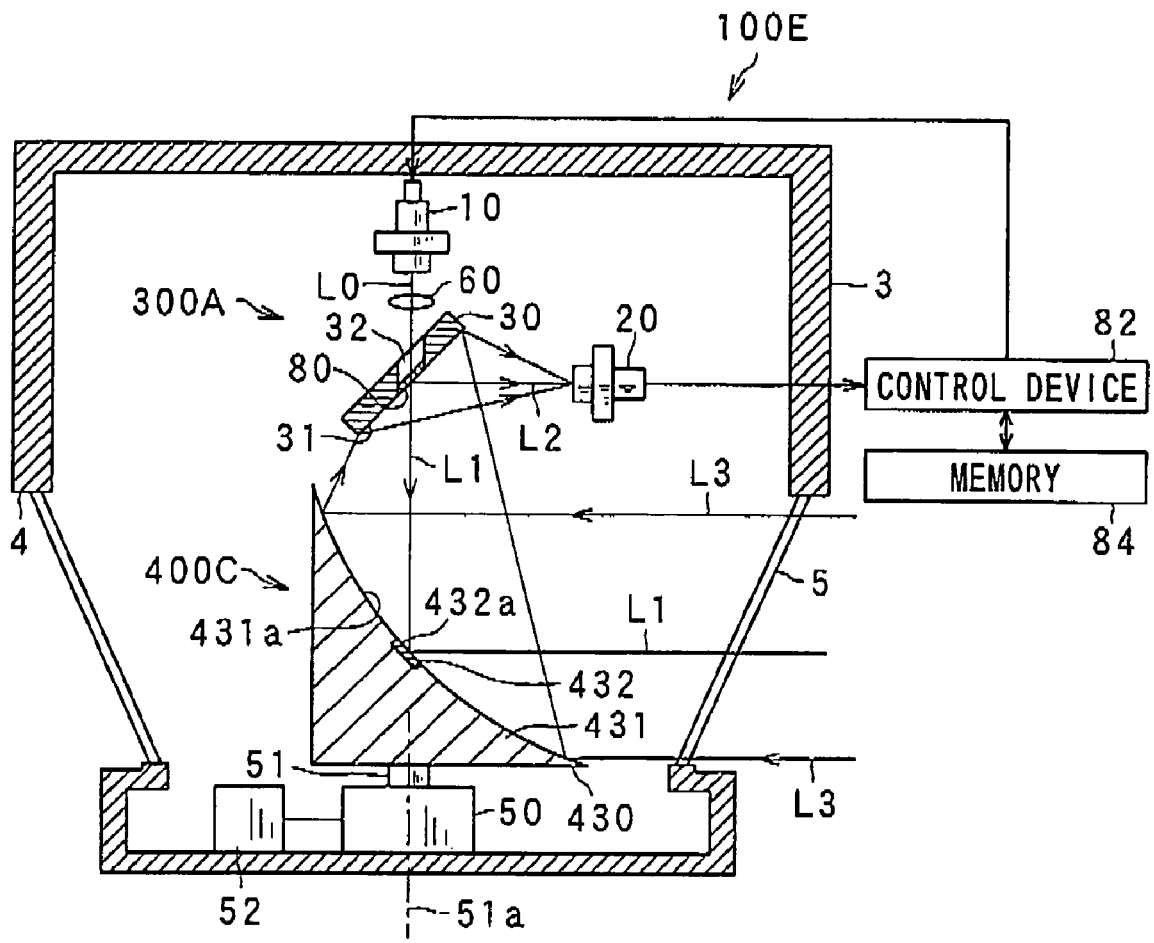
FIG. 14 is a schematic view of a laser radar apparatus according to a sixth embodiment of the present invention.
Figure 15:
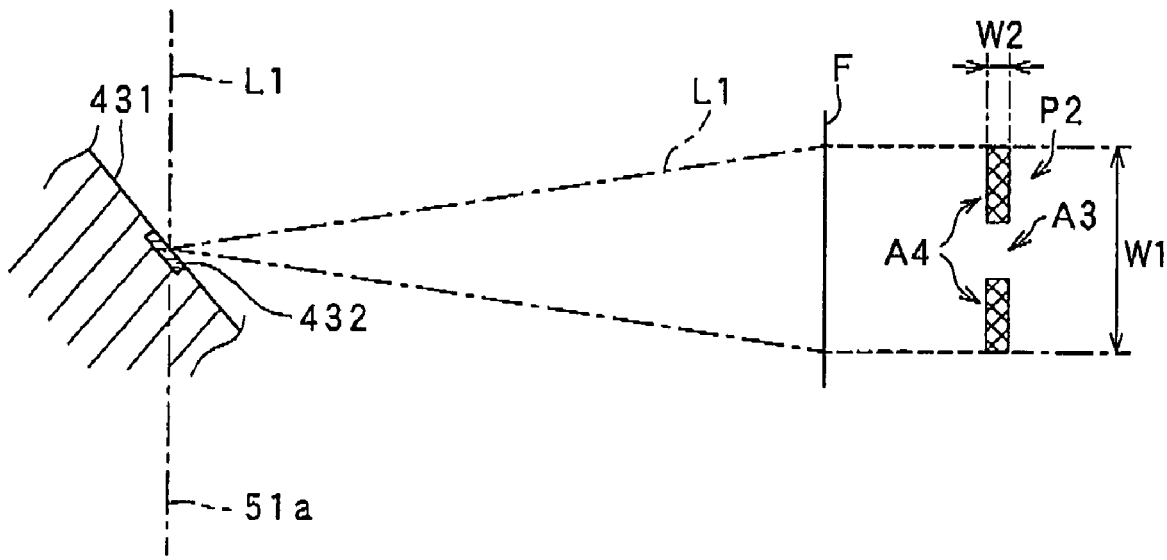
FIG. 15 is a graph illustrating a projection pattern of an outgoing light transmitted through a diffraction grating member and deflected by a planar mirror portion of a concave mirror of the laser radar according to a sixth embodiment of the present invention.

Referring to FIGS. 14-15, a laser radar apparatus 100E according to a sixth embodiment of the present invention will be described.

FIG. 14 is a schematic view of the laser radar apparatus 100E according to the sixth embodiment of the present invention.

In the present embodiment, the differences from the fourth embodiment are based on the different structure of a rotary device 400C from the rotary device 400B because the rotary device 400C includes a concave mirror 430 that is different from the concave mirror 420. Thus, detailed discussion about the constituents of the laser radar apparatuses having the same function and structure with those used in the fourth embodiment will be omitted.

The laser radar apparatus 100E has a rotary device 400C having a concave mirror 430. The concave mirror 430 has a concave reflecting portion 431 that has a concave-shaped mirror surface 431a and a flat reflecting portion 432 that has a flat mirror surface 432a. The reflecting portion 431 has the identical structure with the reflecting portion 421 disclosed in the fourth embodiment. The concave-shaped mirror surface 431a of the concave reflecting portion 431 encloses the flat mirror surface 432a of the flat reflecting portion 432. The flat mirror surface 432a of the flat reflecting portion 432 is positioned on the axis of the outgoing laser beam L0 that is emitted from the laser diode 10. In more detail, the first outgoing laser beam L1 split by the half-silvered mirror 80 injects into the flat mirror surface 432a.

The rotary device 400C has a rotation axis 51a that is defined as the axis of the output shaft 51 of the motor 50. The rotation axis 51a is coincident with the axis of the outgoing laser beam L0 and the first outgoing laser beam L1 between the laser diode 10 and the concave mirror 430. The concave reflecting portion 431 of the concave mirror 430 has a focal point on the rotation axis 51a of the rotary device 400B. Hence, after the incoming laser beam L3 reflected back by the object is deflected by the concave reflecting portion 431 of the concave mirror 430, the incoming laser beam L3 is collected to the focal point positioned on the rotation axis 51a.

Further, in the laser radar apparatus 100E according to the present embodiment, the flat reflecting portion 432 of the concave mirror 430 includes a reflection type diffraction grating. The flat reflecting portion 432 reflects the outgoing laser beam L0 emitted from the laser diode 10 and transmitted through the half-silvered mirror 80 toward the measurement range and transforms the outgoing laser beam L0 so as to generate a predetermined projection pattern that covers a larger cross sectional area than the cross sectional area of the collimated outgoing laser beam L0 by the optical lens 60. The incident laser beam to the flat reflecting portion 432 is the laser beam of parallel rays collimated by the optical lens 60. The incident laser beam is dispersed such that the diameter of the first outgoing laser beam L1 is increased by its deflection by the flat reflecting portion 432.

FIG. 15 is a graph showing an exemplary projection pattern P2 of the first outgoing light L1 generated by the flat reflecting portion 432 including the reflection type diffraction grating. The projection pattern P2 is different form the projection pattern P1.

The projection pattern P2 is obtained when the apparatus 100E having the rotary device 400C is set on the horizontal plane, the first outgoing laser beam L1 exits from the apparatus 100E in the horizontal direction. Thus, if a vertical plane F is prepared in the measuring range, and the first outgoing laser beam L1 is incident on the vertical plane F, the distribution of intensity of the first outgoing laser beam L1 has a rectangular shape, as shown in FIG. 15.

As shown in FIG. 15, the projection pattern P2 has three rectangular areas in a vertical direction parallel to the rotation axis 51a. Thus, the projection pattern P2 has the shape of a long narrow rectangle having a longer edge and a shorter edge. That is, the projection pattern P2 has a dark area A3 and a pair of bright areas A4. The dark area A3 is sandwiched between the pair of the bright areas A4. The length of the longer edge W1 is longer than the length of the shorter edge W2, as shown in FIG. 15.

In the laser radar apparatus 100E according to the present embodiment, the same advantages with the fifth embodiment can be obtained. Further, the flat reflecting portion 432 transforms the incident laser beam to have the projection pattern P2. The projection pattern P2 has the pair of the bright areas A4 and the dark area A3 that is sandwiched between the pair of the bright areas A4. Thus, the mirror assembly 300A can reduce the loss of the incoming laser beam L3 generated by the incoming laser beam L3 injecting the through-hole 32. Therefore, the laser radar apparatus 100E has improved beam splitting efficiency and improved accuracy of detecting the direction and the distance to an object.

Further, the projection pattern P2 has the shape of a long narrow rectangle having the longer edge parallel to the rotation axis 51a, and has a pair of the bright areas A4 that sandwich the dark area A3 in the direction parallel to the rotation axis 51a. Thus, it is possible to improve the resolution of the direction of the object.

Modification of the Embodiments

While the present invention has been disclosed in terms of the preferred embodiment in order to facilitate a better understanding thereof, it should be appreciated that the invention can be embodied in various ways without departing from the principle of the invention.

For example, in the first and second embodiments, the optical lens 60 is provided between the laser diode 10 and the mirror 30. The optical lens 60 corresponds to collimating means. However, it is possible to remove the optical lens 60. In this case, the outgoing laser beam L0 is diffusive and passes through the through-hole 32. Further, it is preferable that the optical lens 60 includes a collector lens.

Further, in the first and second embodiments, the through-hole 32 of the mirror is designed such that the projected image of the through-hole 32 has a circular shape, if the through-hole 32 is projected to a plane perpendicular to the axis of the outgoing laser beam L0. However, it is allowed that the projected image of the through-hole 32 has the rectangular shape and others.

Further, in the second embodiment, both the second outgoing laser beam L2 and the incoming laser beam L3 are detected by the photo diode 20. However, it is preferable that there are two photo diodes, one is used to detect the second outgoing laser beam L2 and the other is used to detect the incoming laser beam L3. In this case, if a dispersion means may be useful if it is provided between the mirror assembly 300A and the photo diode 20.

Further, in the third embodiment, both the first cover member 92 having the first slit 93 and the second cover member 95 having the second slit 96 is included to the apparatus. However, it is allowed that only one of the first and second cover members 92, 96 is included. Further the slits 93, 96 are covered by a filter that adapts to transmit only laser beams.

In the third embodiment, the slits 93, 96 are formed in the shape of circle. However, the shape of the slits is not limited to circular one. Other shapes such as a polygon may be acceptable.

Moreover, it is possible that the laser radar apparatuses in the second, fourth, fifth, and sixth embodiments further include the first cover member 92 having the first slit 93 and the second cover member 95 which are disclosed in the third embodiment.

In the fourth, fifth, and sixth embodiments, the mirror assembly 300A includes the half-silvered mirror 80. However, it is allowed that the mirror assembly 300A does not include the half-silvered mirror 80.

What is claimed is:

1. A laser radar apparatus that measures the distance of an object and the direction to the object, the object being located in a measurement range from the laser radar apparatus, comprising:

laser beam generating means for generating a laser beam having an axis thereof and emitting the laser beam toward the measurement range;

photo detecting means for detecting a reflected laser beam that is reflected back by the object located in the measurement range;

a mirror assembly comprising:
a through-hole that pierces the mirror assembly being coaxial with the axis of the laser beam emitted from the laser beam generating means and passes the laser beam emitted from the laser beam generating means; and
a reflecting surface that is arranged to be at a predetermined angle to the axis of the laser beam emitted from the laser beam generating means and reflects a reflected laser beam reflected back by the object toward the photo detecting means;

light deflecting means for deflecting the laser beam emitted from the laser beam generating means toward the measurement range and deflecting the laser beam reflected back by the object located in the measurement range toward the mirror assembly, the light deflecting means having a rotation axis thereof and a mirror surface; and rotation driving means for rotating the light deflecting means around the rotation axis of light deflecting means such that the mirror surface of the light deflecting means is turned to face in the direction of the measurement range.

2. The apparatus according to claim 1, wherein
the rotation axis of the light deflecting means is coincident with the axis of the laser beam emitted from the laser beam generating means, the light deflecting means has a concave shaped surface that has a focal point located on the axis of the rotation axis of the light deflecting means, and the concave shaped surface of the light deflecting means deflects the laser beam emitted from the laser beam generating means toward the measurement range and deflects the laser beam reflected back by the object located in the measurement range toward the mirror assembly.

3. The apparatus according to claim 1, further comprising:

an optical element for transmitting the laser beam emitted from the laser beam generating means toward the measurement range and reflecting the laser beam reflected back by the object located in the measurement range via the light deflecting means, and the through-hole of the mirror assembly is at least partially covered by the optical element.

4. The apparatus according to claim 1, wherein the through-hole of the mirror assembly is completely empty.

5. The apparatus according to claim 1, further comprising:

beam splitting means for splitting the laser beam emitted from the laser beam generating means into a first laser beam and a second laser beam; and control means for adjusting the output of the laser beam generating means, wherein the first laser beam enters to the concave shaped surface of the light deflecting means, the second laser beam enters to the photo detecting means to measure its intensity, and the control means adjusts the output of the laser beam generating means based on the measured intensity of the second laser beam.

6. The apparatus according to claim 5, wherein the beam splitting means includes a half-silvered mirror.

7. The apparatus according to claim 5, wherein the beam splitting means includes a mirror device that blocks at least a part of the laser beam and the reflected laser beam passing through the through-hole of the mirror.

8. The apparatus according to claim 1, wherein a peripheral surface of the through-hole has a projected image that obtained by the through-hole projecting a plane perpendicular to the axis of the laser beam emitted from the laser beam generating means, and the projected image has an approximately circular shape.

9. The apparatus according to claim 1, further comprising:

laser beam collimating means for collimating the laser beam emitted from the laser beam generating means into a laser beam of parallel rays, wherein collimating means is located on the optical path of the laser beam emitted from the laser beam generating means.

10. The apparatus according to claim 1, further comprising:

a cover case that has a slit through which the laser beam emitted from the laser beam generating means or the reflected laser beam is reflected back by the object wherein the slit is arranged to be located on at least one of the optical paths of the laser beam emitted from the laser beam generating means and the reflected laser beam reflected back from the object.

11. The apparatus according to claim 10, wherein the slit of the cover case has the shape of cylinder having a circular shaped cross section.

12. The apparatus according to claim 1, further comprising:

beam transforming means for transforming the laser beam emitted from the laser beam generating means to a transferred laser beam having a predetermined projection pattern, the beam transforming means being arranged to be located on the optical path of the laser beam emitted from the laser beam generating means between the laser beam generating means and the measurement range, wherein the beam transforming means transforms the laser beam emitted from the laser beam generating means so as to have a predetermined projection pattern that covers a larger area than the cross sectional area of the incident laser beam.

13. The apparatus according to claim 12, wherein the mirror surface of the light deflecting means has a flat reflecting portion having a flat mirror surface and a concave reflecting portion having a concave-shaped mirror surface, the concave-shaped mirror surface having a focal point located on the rotation axis of the light deflecting means, the concave-shaped mirror surface of the light deflecting means deflects the laser beam reflected back by the object located in the measurement range toward the mirror assembly, and the flat mirror surface of the light deflecting means deflects the laser beam emitted from the laser beam generating means toward the measurement range.

14. The apparatus according to claim 13, wherein the beam transforming means is embedded in the flat mirror surface of the light deflecting means such that the laser beam emitted from the laser beam generating means is transformed to have the predetermined projection pattern in the measurement range.

15. The apparatus according to claim 12, wherein the beam transforming means is arranged to be located on the axis of the laser beam emitted from the laser beam generating means between the laser beam generating means and the through-hole of the mirror assembly.

16. The apparatus according to claim 12, wherein the beam transforming means includes a diffraction grating.

17. The apparatus according to claim 12, wherein the predetermined projection pattern includes a bright area and a dark area enclosed by the bright area, wherein a larger quantity of light shines upon the bright area than the dark area.

18. The apparatus according to claim 12, wherein the predetermined projection pattern includes a pair of bright areas and a dark area put between the pair of the bright areas.

19. The apparatus according to claim 18, wherein the predetermined projection pattern is designed such that the pair of the bright areas are located on the rotation axis of the light deflecting means with a predetermined spacing.

* * * * *